United States Patent
Kawaba

(10) Patent No.: US 8,244,746 B2
(45) Date of Patent: Aug. 14, 2012

(54) PARALLEL LINKING SYSTEM AND PARALLEL LINKING METHOD

(75) Inventor: Motoyuki Kawaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 12/874,148

(22) Filed: Sep. 1, 2010

(65) Prior Publication Data

US 2011/0055236 A1    Mar. 3, 2011

(30) Foreign Application Priority Data

Sep. 2, 2009    (JP) .................................. 2009-202305

(51) Int. Cl.
*G06F 17/30*    (2006.01)

(52) U.S. Cl. ..................................................... 707/758

(58) Field of Classification Search .................. 707/758; 717/128; 714/2, 45; 709/238, 206
See application file for complete search history.

(56) References Cited

U.S. PATENT DOCUMENTS

| | | | |
|---|---|---|---|
| 5,740,355 A | | 4/1998 | Watanabe |
| 5,857,077 A | * | 1/1999 | Nakagaki et al. ............. 709/238 |
| 5,978,902 A | * | 11/1999 | Mann ........................... 712/227 |
| 7,395,963 B2 | * | 7/2008 | Silverbrook et al. .......... 235/385 |
| 7,801,742 B2 | * | 9/2010 | Silverbrook et al. ............. 705/2 |
| 2009/0106741 A1 | * | 4/2009 | Dageville et al. ............. 717/128 |

FOREIGN PATENT DOCUMENTS

| | | |
|---|---|---|
| JP | 05-61697 A | 3/1993 |
| JP | 09-128342 A | 5/1997 |
| JP | 11-53323 A | 2/1999 |

* cited by examiner

*Primary Examiner* — Jean M Corrielus
(74) *Attorney, Agent, or Firm* — Fujitsu Patent Center

(57) ABSTRACT

A method for use in a computer including a storage to store a trace record including a pair of a key character string and a value in a message and a message that has not yet been subjected to linking. The method includes identifying, from a received message or trace information received from a different linking apparatus, pairs of a key character string and the value thereof, pairs of a key character string and a value included in messages that have not yet been subjected to linking and that are to be subjected to linking and registering the identified pairs in the storage.

19 Claims, 25 Drawing Sheets

FIG.8

| KEY CHARACTER STRING | VALUE | MESSAGE |
|---|---|---|
| SES | 20 | M4: ID=200 SES=20, M6: SES=20 |
| SES | 10 | M3: ID=100 SES=10, M5: SES=10 |

FIG.9

| KEY CHARACTER STRING | VALUE | MESSAGE |
|---|---|---|
| SES | 200 | M2: ID=200 |
| SES | 100 | M1: ID=100 |

FIG.10

| KEY CHARACTER STRING 1 | VALUE 1 | KEY CHARACTER STRING 2 | VALUE 2 | NUMBER OF NOTIFICATION MESSAGES | NUMBER OF PROCESSES |
|---|---|---|---|---|---|
| SES | 20 | ID | 200 | 1 | 0 |
| SES | 10 | ID | 100 | 1 | 0 |

FIG.12

| KEY CHARACTER STRING | VALUE | SERVER NAME |
|---|---|---|
| ID | 100 | 134 |
| ID | 200 | 135 |

FIG.13

| CONDITION | SERVER NAME |
|---|---|
| IF MOD 10 OF VALUE OF ID IS 0 | LINKING PROCESSING APPARATUS A |

FIG.17
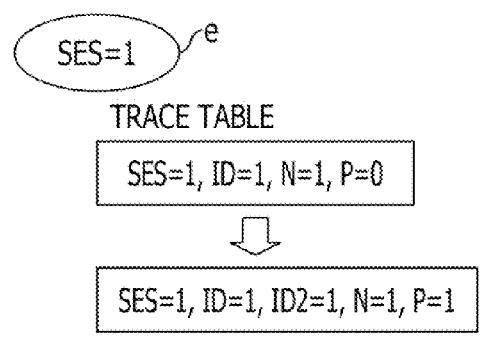
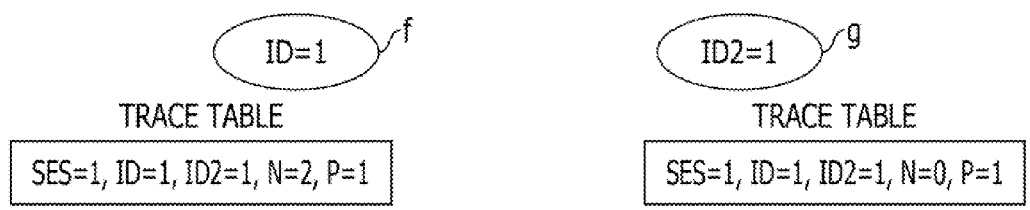

PARALLEL LINKING SYSTEM AND PARALLEL LINKING METHOD

CROSS REFERENCES TO RELATED APPLICATIONS

This application is based upon and claims the benefit of priority of the prior Japanese Patent Application No. 2009-202305, filed on Sep. 2, 2009, the entire contents of which are incorporated herein by reference.

FIELD

The embodiments discussed herein are related to a linking technique for linking messages related to one another.

BACKGROUND

In general, in systems including servers in each of a plurality of layers that exchange messages with each other and perform processing (e.g., electronic commerce systems), the messages are exchanged among servers using, as a key, a character string (e.g., a request ID) that associates messages with one another. In addition, in some cases, different key character strings are used in different layers (e.g., a Web server layer and an application server layer).

In order to monitor system behavior or analyze a request delay, by using such a plurality of key character strings, a process for putting together related messages (i.e., a linking process) is performed at high speed and analyzes the route of a message corresponding to a particular request and the time at which the message flows.

However, the number of messages that flow in the system is enormous and, therefore, only a single linking apparatus (e.g., a single computer) may not be sufficient to process the messages within a predetermined period of time. Accordingly, for example, a plurality of linking apparatuses can be provided and perform linking processes in parallel in accordance with key character strings to be processed.

For example, when a linking process is performed by a single linking apparatus and a response to a request sent from a client terminal is not returned, it is easy to extract a message that has not yet been linked, since the extraction can be done by reading a message that has not been linked and that is stored in a buffer of the single linking apparatus. However, if there are a plurality of linking apparatuses performing linking processes in parallel, identifying a linking apparatus that stores the message is difficult and, therefore, the message cannot be extracted easily.

SUMMARY

According to a certain aspect of the invention, a data collection processing method for use in a computer is provided. The method including: receiving a message or trace information; selecting, from the received message or the trace information, a plurality of pairs of a key character string and value thereof, the plurality of pairs being used to link related messages; registering the selected pairs in a trace data storage unit of the computer as a new trace record or updating an existing trace record that includes some of the selected pairs; identifying a transfer destination for the pairs included in the newly registered or updated trace record based on a first rule; transmitting, as outgoing trace information, the pairs to the identified transfer destination; when receiving a search command including a first pair of a key character string and value thereof, searching the trace data storage unit of the computer using the first pair and returning data of a found trace record to a source of the search command, when receiving a message collection command including a second pair of a key character string and value thereof, searching the transaction management table storage unit of the computer using the second pair and transmitting the message collection command including a found message to one of a linking apparatus identified using a second rule and a source of the received message collection command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 8 illustrates a first example of a transaction management table;
FIG. 9 illustrates a second example of a transaction management table;
FIG. 10 illustrates an example of a trace table;
FIG. 12 is an example of data stored in an identification data storage unit;
FIG. 13 is an example of data stored in the identification data storage unit;
FIG. 17 illustrates an example of the trace information notifying process.

DETAILED DESCRIPTION OF THE PREFERRED EMBODIMENTS

An example linking process performed by a plurality of linking apparatuses, each having an assigned role, is described next.

Figure 1:
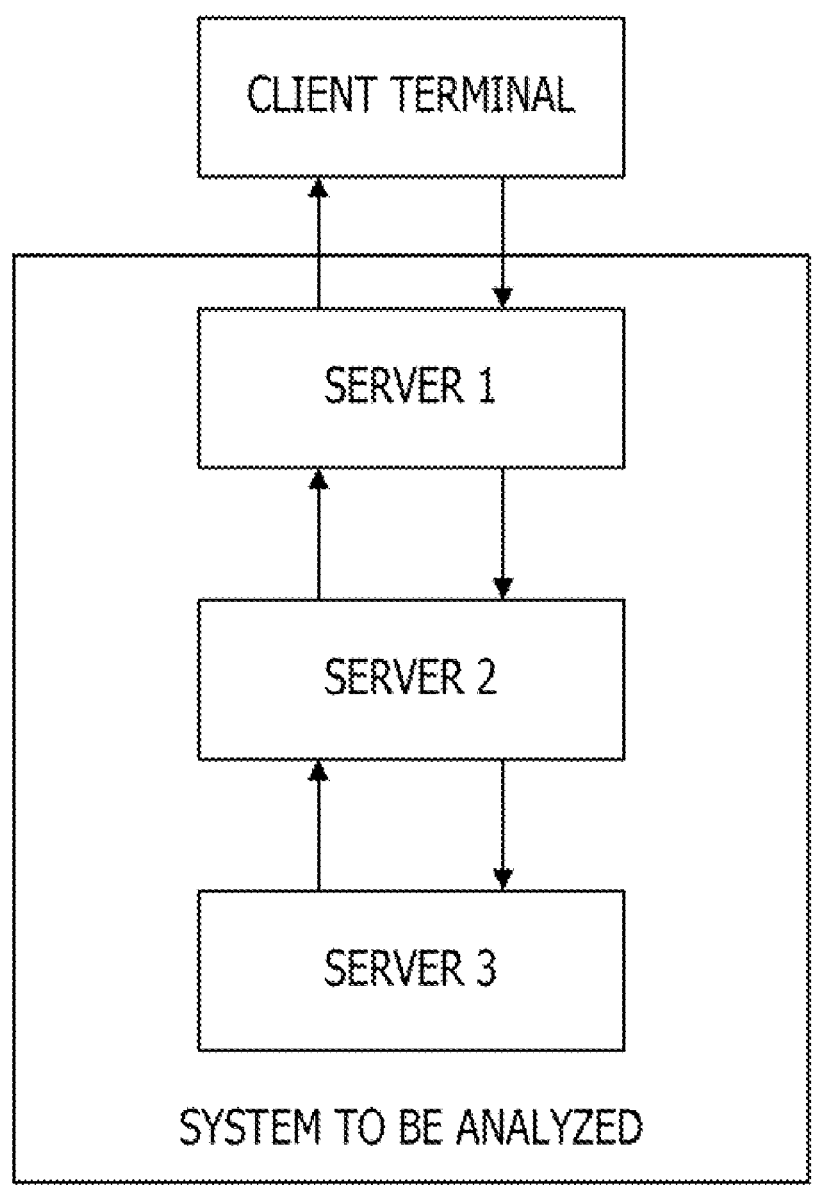
FIG. 1 illustrates an example of a system to be analyzed.

FIG. 1 illustrates an example of a system to be analyzed. The system includes servers 1 to 3. The server 1 communicates a message with a client terminal and communicates a message with the server 2. In addition, the server 2 communicates a message with the server 1 and communicates a message with the server 3. The server 3 communicates a message with the server 2. In this way, messages are exchanged among the plurality of computers, and a response to a request of the client terminal is returned to the client terminal.

Figure 2:
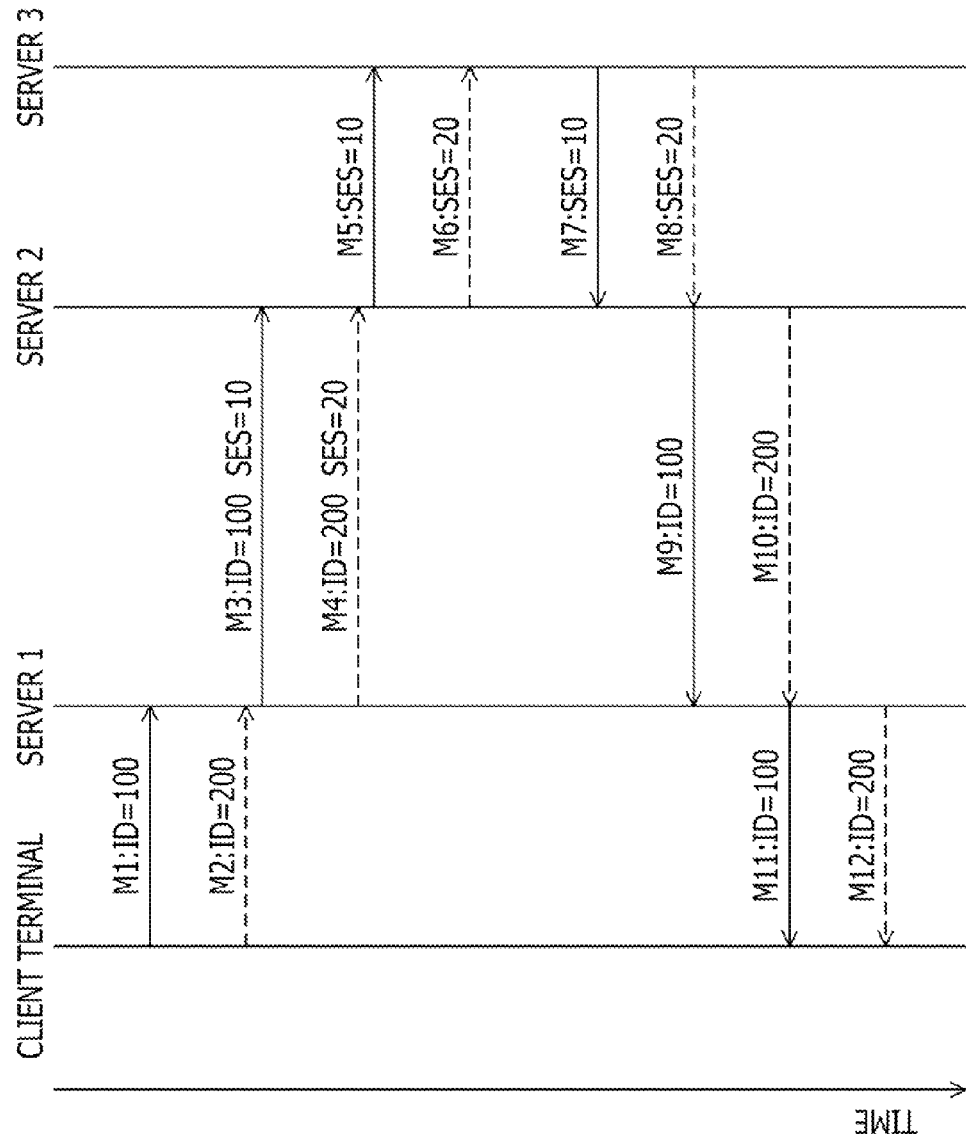
FIG. 2 illustrates an example of a message exchanged in the system to be analyzed.

FIG. 2 illustrates an example of a message exchanged in such a system. For example, the client terminal sends a message M1 having an ID of 100 to the server 1, where the ID is in the form of a key character string (a session number or a request number), and "100" is the value of the key character string. Upon receiving the message M1, the server 1 sends, to the server 2, a message M3 including data indicating that ID=100 and SES=10 (the SES is a key character string, and "10" is the value of the key character string). Thereafter, the server 2 sends, to the server 3, a message M5 including data indicating that SES=10. The server 3 performs post-processing upon reception of the message M5 and sends, to the server 2, a message M7 including data indicating that SES=10. Upon receiving the message M7, the server 2 sends, to the server 1, a message M9 including data indicating that ID=100. Upon receiving the message M9, the server 1 sends, to the client terminal, a message M11 including data indicating that ID=100.

Similarly, the client terminal sends, to the server 1, a message M2 including data indicating that ID=200. Upon receiving the message M2, the server 1 sends, to the server 2, a message M4 including data indicating that ID=200 and SES=20. Thereafter, the server 2 sends, the server 3, a message M6 including data indicating that SES=20. The server 3 performs post-processing of reception of the message M6 and sends, to the server 2, a message M8 including data indicating that SES=20. Upon receiving the message M8, the server 2 sends, to the server 1, a message M10 including data indicating that ID=200. Upon receiving the message M10, the server 1 sends, to the client terminal, a message M12 including data indicating that ID=200.

The above description is of the messages flow inside the system to be analyzed and between the system to be analyzed and a client terminal. Such messages are captured by a router and/or a switch and are linked to one another by a parallel linking system as described below.

Figure 3:
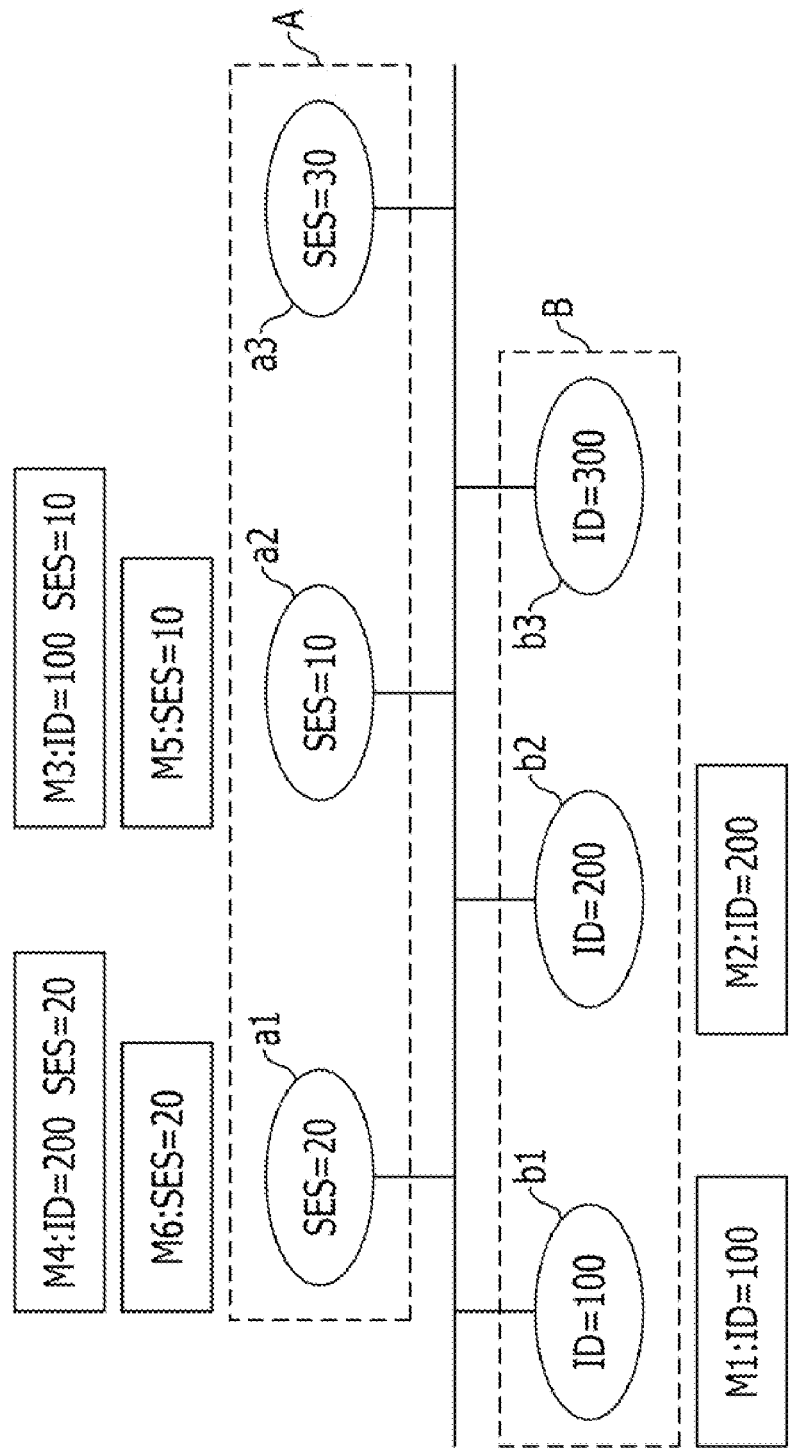
FIG. 3 illustrates an example of parallel linking.

More specifically, as shown in FIG. 3, a message receiving apparatus receives a captured message and outputs the received message to a message dispatching apparatus. In this example, six linking apparatuses are divided into two groups: a group A that links messages using the key character string SES and a group B that links messages using the key character string ID. In addition, each of linking apparatuses a1 to a3 in the group A links messages using the value of the key character string SES to which the linking apparatus is assigned. Similarly, linking apparatuses b1 to b3 in the group B link messages using the value of the key character string ID in cooperation with one another. The message dispatching apparatus has a dispatching rule. The message dispatching apparatus selects one of the linking apparatuses assigned to a message in accordance with the key character string and the value of the key character string and sends the message to the selected linking apparatus.

For example, the linking apparatus a1 is responsible for processing a message including SES=20. The linking apparatus a2 is responsible for processing a message including the SES=10. The linking apparatus a3 is responsible for processing a message including SES=30. In addition, the linking apparatus b1 is responsible for processing a message including ID=100. The linking apparatus b2 is responsible for processing a message including ID=200. The linking apparatus b3 is responsible for processing a message including ID=300. Note that a priority is assigned to each of the key character strings. A message including the SES has a priority over a message including the ID.

Thus, the message M1 including only ID=100 is dispatched to the linking apparatus b1 by the message dispatching apparatus. The message M2 including only ID=200 is dispatched to the linking apparatus b2 by the message dispatching apparatus. In addition, the message M6 including only SES=20 is dispatched to the linking apparatus a1 by the message dispatching apparatus. The message M5 including only SES=10 is dispatched to the linking apparatus a2 by the message dispatching apparatus. Furthermore, the message M4 including ID=200 and SES=20 is dispatched to the linking apparatus a1 by the message dispatching apparatus. The message M3 including ID=100 and SES=10 is dispatched to the linking apparatus a2 by the message dispatching apparatus.

Figure 4:
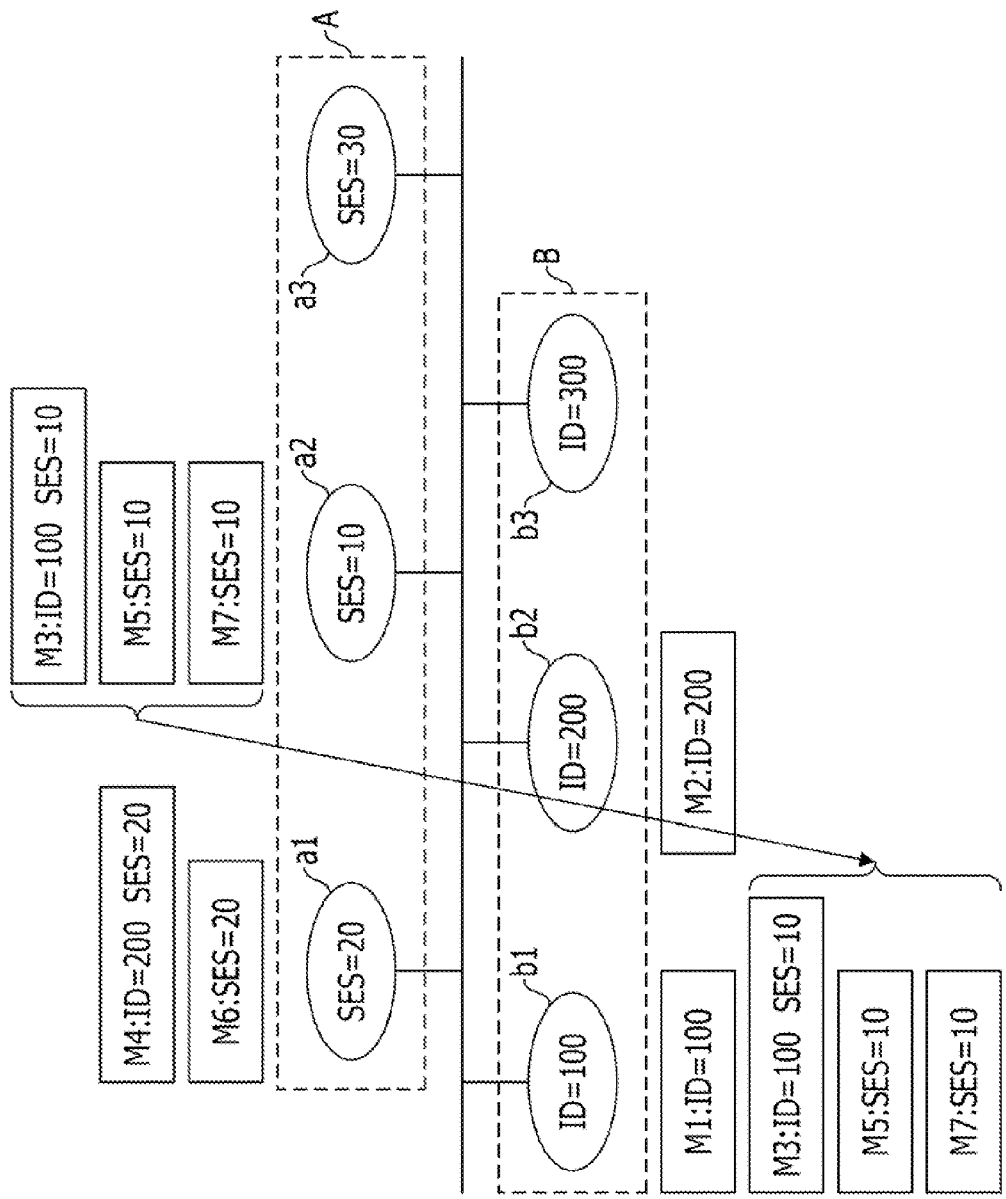
FIG. 4 illustrates an example of parallel linking.

As shown in FIG. 4, the message receiving apparatus receives the messages M5 and M7 each including SES=10 and sends the messages to the message dispatching apparatus. Upon receiving the messages, the dispatching unit tentatively dispatches the messages M5 and M7 to the linking apparatus a2 in accordance with the above-described rule. When three messages having the same pair of the key character string and the value thereof (SES=10 in this example) are accumulated in the linking apparatuses a1 to a3 in the group A, the three messages are forwarded to the linking apparatus b1 which is selected in accordance with another pair of the key character string and the value included in the messages (ID=100 in this example). More specifically, the messages M3, M5, and M7 are forwarded from the linking apparatus a2 to the linking apparatus b1.

Figure 5:
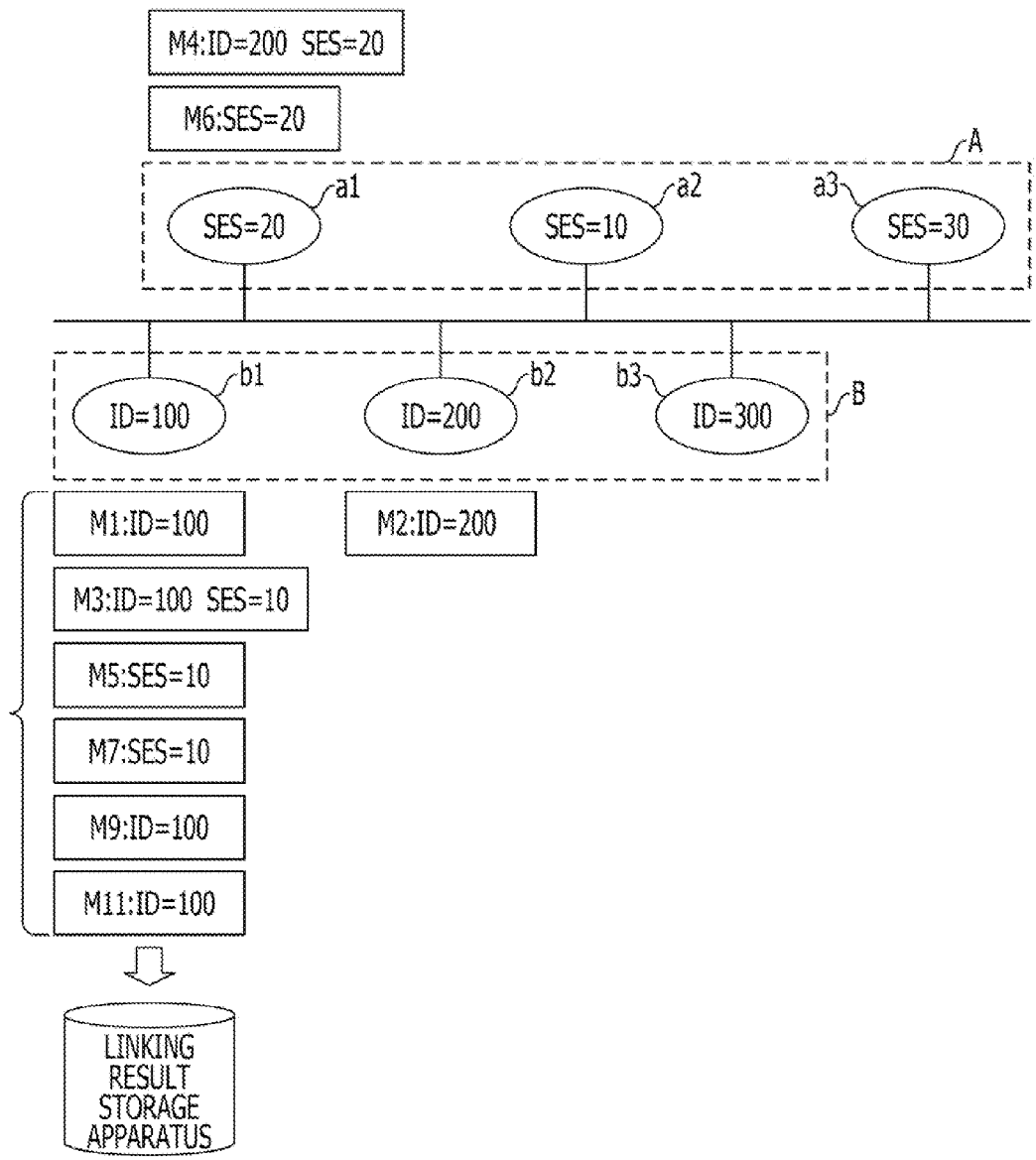
FIG. 5 illustrates an example of parallel linking.

In addition, as shown in FIG. 5, the message receiving apparatus receives the messages M9 and M11 each including ID=100 and outputs the messages to the message dispatching apparatus. Upon receiving the messages, the message dispatching unit dispatches the messages M9 and M11 to the linking apparatus b1 in accordance with the above-described rule. For example, when six messages have either the pair of the assigned key character string and the value (ID=100 in this example) or the pair of the key character string and the value (SES=10 in this example) related to the pair are accumulated in the linking apparatuses b1 to b3 in the group B, the linking is completed and, the messages are stored in a linking result storage apparatus. More specifically, the messages M1, M3, M5, M7, M9 and M11 are stored in the linking result storage apparatus.

In this way, messages generated from a request submitted from a client terminal as shown in FIG. 2 are linked to one another and are stored in the linking result storage apparatus.

In addition, as described above, in some cases, a demand for correctly recognizing the progress of processing of a particular request that has not been completed arises. For example, when any response is not received after a purchase button is clicked in a Web page, a user wants to know what problem occurs. However, since the processing has not been completed, the messages may be stored in several linking apparatuses. Accordingly, inquiries may need to be sent to all of the linking apparatuses. This operation may unnecessarily imposes a processing load on the linking apparatuses.

In addition, before sending the inquiries, all of the messages to be linked cannot be collected by knowing only some of key character strings. In the above-described example, the messages cannot be extracted by knowing only ID=100. The information SES=10 needs to be used. Accordingly, it is difficult to collect the messages by simply sending inquiries.

Furthermore, the linking apparatuses are asynchronously operating. Accordingly, when an inquiry is sent to one of the linking apparatuses in order to collect a message, the message may be moved to another linking apparatus. To solve this problem, the parallel linking system may be temporarily stopped. In such a case, the performance of the system is degraded.

Therefore, according to the present embodiment, by employing the following configuration, a message that has not been subjected to linking can be correctly collected with only a small and/or minimal degradation in performance.

Figure 6:
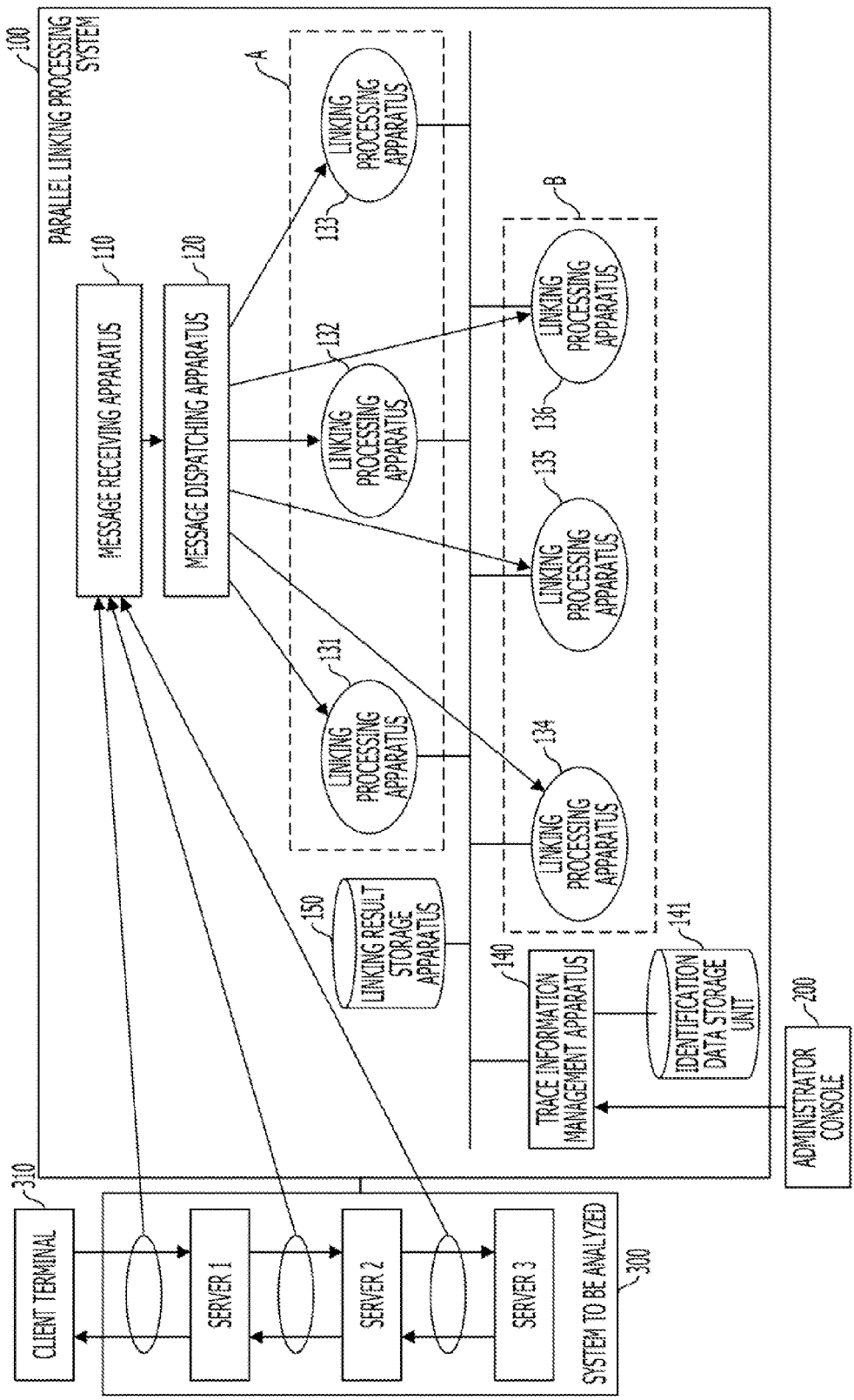
FIG. 6 is a block diagram illustrating the configuration of a parallel linking system.

FIG. 6 is a block diagram of a system according to the present embodiment. According to the present embodiment, a parallel linking system 100 is connected to a system 300 to be analyzed. In the present embodiment, the system 300 to be analyzed has the same configuration as that illustrated in FIG. 1. The parallel linking system 100 includes a message receiving apparatus 110, a message dispatching apparatus 120, a plurality of linking apparatuses 131 to 136, a linking result storage apparatus 150, which are similar to those described above. The parallel linking system 100 further includes a trace information management apparatus 140. The message receiving apparatus 110, the message dispatching apparatus 120, the linking apparatuses 131 to 136, and the trace information management apparatus 140 may be realized using a plurality of computers, for example. In such a case, the computers are connected to one another via a network. In order for the linking apparatuses 131 to 136 to perform the linking in parallel, it is desirable that the linking apparatuses 131 to 136 be realized in different computers. However, all of the linking apparatuses 131 to 136 need not be realized in different computers.

Note that an administrator console 200 is connected to the parallel linking system 100. The administrator console 200 outputs an instruction to the trace information management apparatus 140 and receives the result of processing performed by the trace information management apparatus 140.

As noted above, all messages exchanged in the system 300 to be analyzed are captured and output to the message receiving apparatus 110. The message receiving apparatus 110 outputs the received message to the message dispatching apparatus 120. The message dispatching apparatus 120 selects one of the linking apparatuses in accordance with a dispatching rule and a pair of the key character string and the value thereof included in the message and outputs the message to the selected linking apparatus. As in the above-described example, the linking apparatuses 131 to 136 are grouped into a group A for performing linking in terms of the key character string SES and a group B for performing linking in terms of the key character string ID. However, such grouping can be made in accordance with the number of types of key character strings. The linking apparatuses 131 to 136 communicate with one another so as to exchange messages, exchange trace information described below, and transfer a message collection command (a Collect command) sent from the trace information management apparatus 140. Note that a message that has been subjected to linking is stored in the linking result storage apparatus 150.

As described in more detail below, in response to an instruction received from the administrator console 200, the trace information management apparatus 140 sends a search command (a Search command) instructing search for a requested pair of a key character string and the value thereof to the selected linking apparatus and receives the result of processing performed by the linking apparatus. In addition, the trace information management apparatus 140 outputs the result of search to the administrator console 200. The trace information management apparatus 140 can access an identification data storage unit 141 that stores data used for identifying the selected linking apparatus using a pair of a key character string and the value thereof. The particular data storage unit 141 may be disposed in each of the linking apparatuses 131 to 136, for example.

Figure 7:
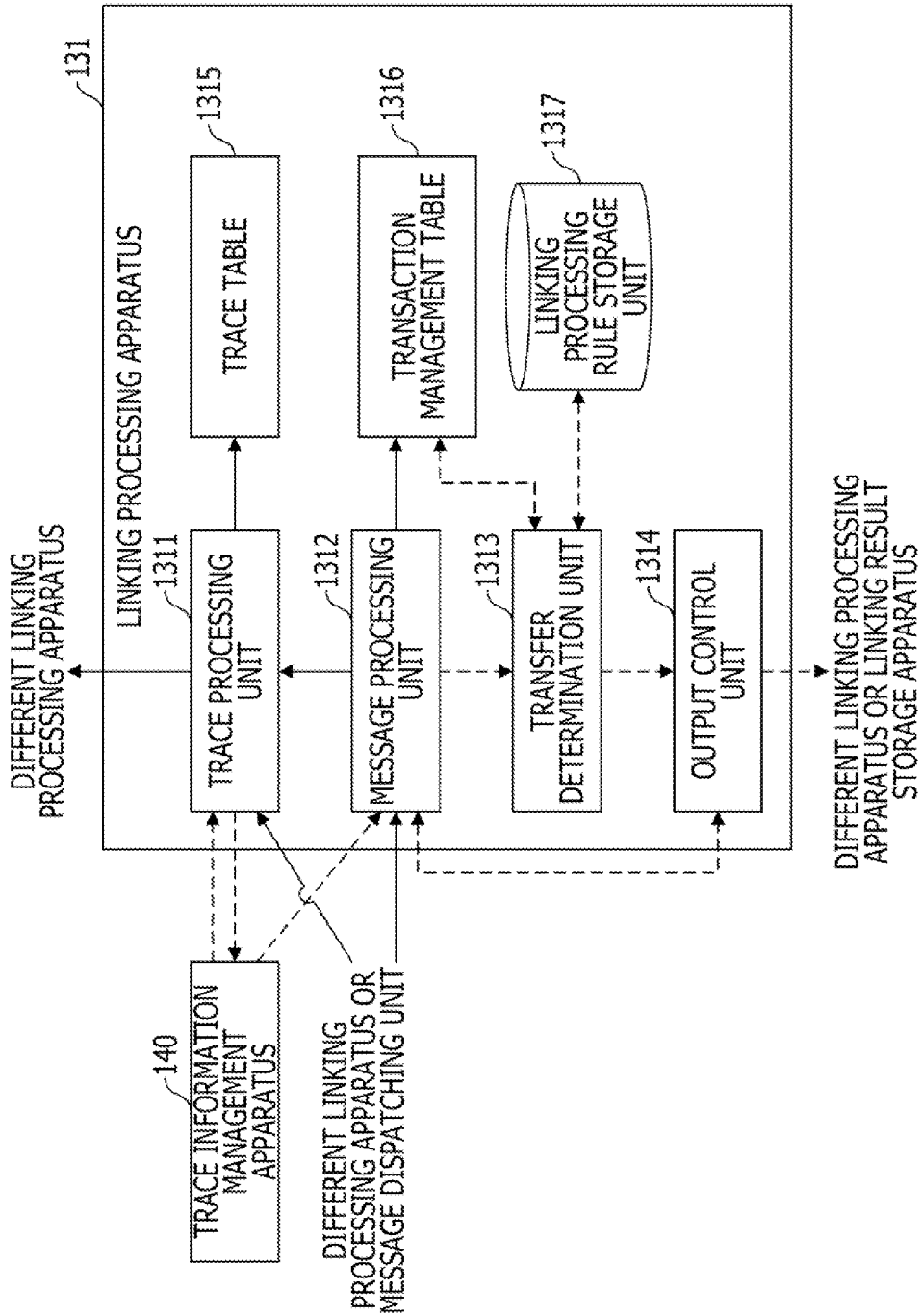
FIG. 7 is a block diagram illustrating the configuration of a parallel linking unit.
Figure 11:
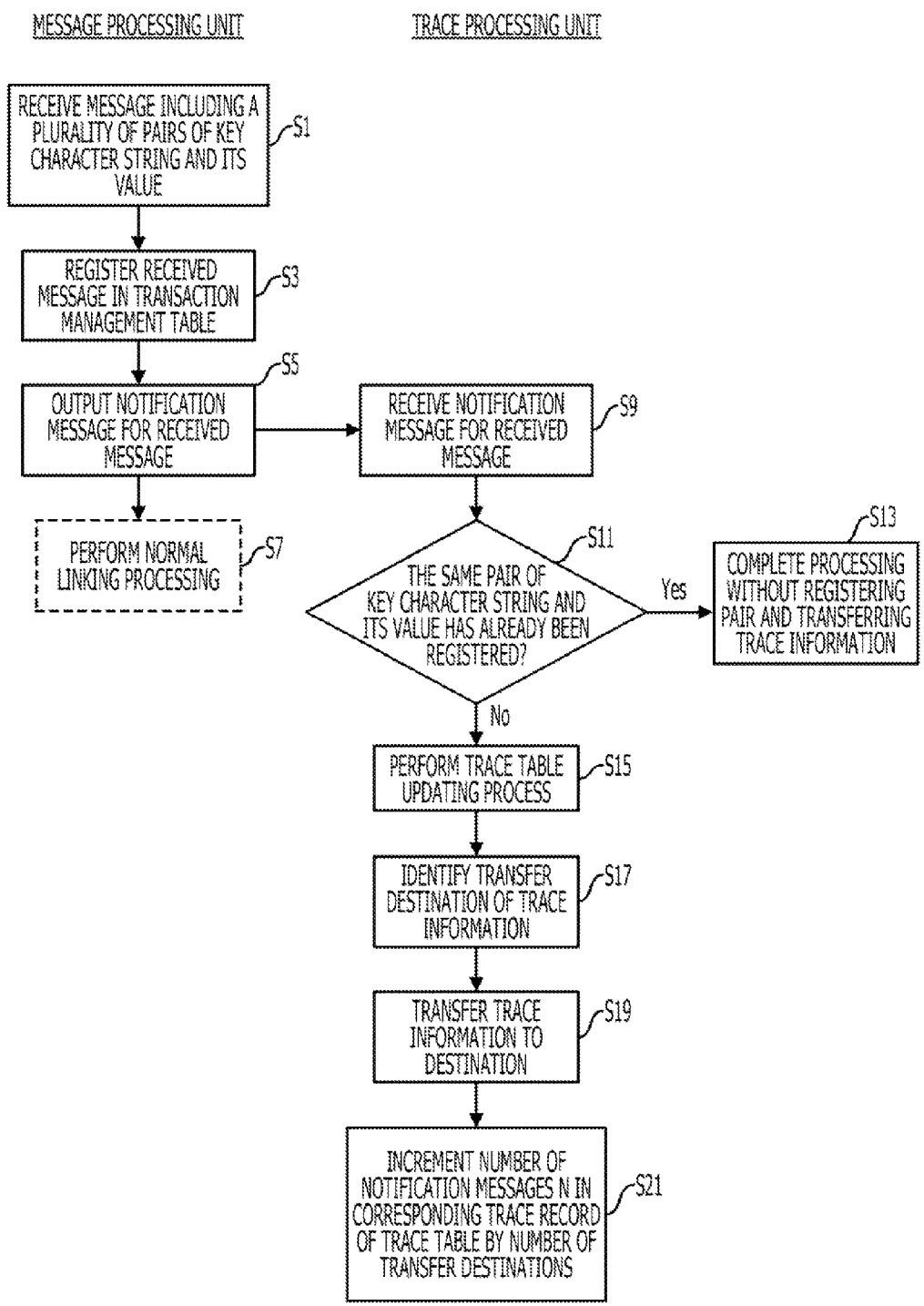
FIG. 11 is a flowchart of an example trace information notifying process.

FIG. 7 illustrates an example configuration of each of the linking apparatuses 131 to 136. As illustrated in FIG. 7, the linking apparatus 131 includes a trace processing unit 1311, a trace table 1315, a message processing unit 1312, a transfer determination unit 1313, an output control unit 1314, a transaction management table 1316, and a linking rule storage unit 1317. The trace table 1315 is stored in a trace table storage unit, and the transaction management table 1316 is stored in a transaction management table storage unit. The message processing unit 1312 receives a message from a different linking apparatus or the message dispatching apparatus 120 and registers the message in the transaction management table 1316. That is, the transaction management table 1316 functions as a message storage unit. In addition, the transaction management table 1316 outputs a pair of a key character string and the value thereof for the received message to the trace processing unit 1311. The message processing unit 1312 performs the following processing in accordance with an instruction received from the trace information management apparatus 140. At that time, the message processing unit 1312 controls the transfer determination unit 1313 and the output control unit 1314. The transfer determination unit 1313 determines whether the messages registered in the transaction management table 1316 satisfy the linking rule stored in the linking rule storage unit 1317. If the messages satisfy the linking rule, the transfer determination unit 1313 reads the messages and instructs the output control unit 1314 to output the messages to the linking apparatus identified by the linking rule or store the messages in the linking result storage apparatus 150. The output control unit 1314 outputs the messages to the specified destination in accordance with the instruction received from the transfer determination unit 1313.

The trace processing unit 1311 processes the pair of a key character string and the value thereof received from the message processing unit 1312 or trace information received from a different linking apparatus. The trace processing unit 1311 updates the trace table 1315 as needed. In addition, when the trace processing unit 1311 updates the trace table 1315, the trace processing unit 1311 sends, to the different linking apparatus, trace information regarding trace records collected until the update operation was performed. Furthermore, upon receiving a search command (Search) or a trace delete command (Delete) from the trace information management apparatus 140, the trace processing unit 1311 performs processing in accordance with the command and returns the result of processing to the trace information management apparatus 140.

FIG. 8 illustrates an example of data items stored in the transaction management table 1316. In FIG. 8, the linking apparatus 131 is responsible for processing messages including SES=10 and SES=20. The transaction management table 1316 has a column representing a key character string, a column representing the value, and a column representing a corresponding message. A key character string to which the linking apparatus 131 is assigned and the value of the key character string are registered in the columns representing a key character string and the value. The data of the message is registered in the column representing a message. The message M4 (ID=200 and SES=20) and the message M6 (SES=20) are registered in a first management record shown in FIG. 8. In addition, the message M3 (ID=100 and SES=10) and the message M5 (SES=10) are registered in a second management record shown in FIG. 8.

FIG. 9 illustrates another example of data items stored in the transaction management table 1316. In FIG. 9, the linking apparatus 131 is responsible for processing messages including SES=100 and SES=200. The transaction management table 1316 has a column representing a key character string, a column representing the value, and a column representing a corresponding message. A key character string for which the linking apparatus 131 is responsible and the value thereof are registered in the columns representing a key character string and the value. The data of the message is registered in the column representing a message. The message M2 (ID=200) is registered in a first management record shown in FIG. 9. In addition, the message M1 (ID=100) is registered in a second management record shown in FIG. 9.

FIG. 10 illustrates an example of data items stored in the trace table 1315. In the example shown in FIG. 10, the trace table 1315 has a column representing a key character string 1, a column representing a value 1 of the key character string 1, a column representing a key character string 2, a column representing a value 2 of the key character string 2, a column representing the number of notification messages N, and a column representing the number of processes P. A plurality of pairs of a key character string and the value thereof for messages that have not yet been linked and, thus, are to be linked are registered in the trace table 1315. The number of pairs is an integer greater than or equal to 2. In the example shown in FIG. 10, the first trace record indicates that at least one of SES=20 and ID=200 is contained in a message to be linked. The second trace record indicates that at least one of SES=10 and ID=100 is contained in a message to be linked. The number of notification messages represents the number of transmissions of trace information for the trace record (or the number of destinations of the transmission). The number of processes represents the number of receptions of trace information for the trace record.

Example processing performed by the parallel linking system 100 is described next with reference to FIGS. 11 to 24. Upon receiving a message including a plurality of pairs of a key character string and the value thereof from a different linking apparatus or the message dispatching apparatus 120 (S1), the message processing unit 1312 registers the received message in the transaction management table 1316 (S3). Even when the message processing unit 1312 receives a message including only one pair of a key character string and the value thereof, the message processing unit 1312 performs a process in S3. However, the message processing unit 1312 does not perform the processes subsequent to S5 other than the process in S7.

Subsequently, the message processing unit 1312 may output a notification message for the received message to the trace processing unit 1311 (S5). The notification message for the received message includes all pairs of a key character string and the value thereof included in the received message. Note that the process performed by the transfer determination unit 1313 after the process S3 is performed is the same as a normal linking process. As briefly discussed here, the message processing unit 1312 sends, to the transfer determination unit 1313, a notification message indicating that a message is received. In response to the notification message, the transfer determination unit 1313 examines an updated record in the transaction management table 1316. The transfer determination unit 1313 then determines whether the updated record satisfies the condition defined by the rule registered in the linking rule storage unit 1317. For example, the rule indicates a transfer destination to be selected when three messages are accumulated for a pair of a key character string and the value thereof to which the linking apparatus 131 is assigned. If the condition defined in the rule is not satisfied, nothing is performed. However, if the condition defined in the rule is satisfied, the transfer determination unit 1313 reads the message in the updated record from the transaction management table 1316, deletes the updated record, and instructs the output control unit 1314 to output the readout message to the transfer destination (or a storage device at the destination) identified by the transfer destination identification rule. For example, when messages regarding SES=20 are accumulated, the linking apparatus that is responsible for processing the messages is identified using the other pair of a key character string and the value thereof (i.e., ID=200). Thereafter, the messages are transferred to the identified linking apparatus.

The linking rule for the linking apparatus that is responsible for processing a message including "ID=200" includes a transfer destination identification rule indicating that the linking result storage apparatus 150 should be selected as a transfer destination when six messages are accumulated for the record regarding "ID=200" in the transaction management table 1316.

The trace processing unit 1311 receives, from the message processing unit 1312, a notification message indicating that a message is received. The trace processing unit 1311 then stores the notification message in, for example, a storage device, such as a main memory (S9). Thereafter, the trace processing unit 1311 determines whether a trace record having all of the pairs of a key character string and the value thereof that are identical to those included in the notification message has already been registered in the trace table 1315 (S11). If the data that are identical to those included in the notification message have already been registered in the trace table 1315, no further processing is needed. Therefore, the processing is completed (S13).

However, if all of the data identical to those included in the notification message have not been registered in the trace table 1315, the trace processing unit 1311 performs a trace table update process (S15). More specifically, if any one of the pairs of a key character string and the values thereof stored in the trace table 1315 is not identical to any one of the pairs of a key character string and the values thereof included in the notification message, the trace processing unit 1311 generates a trace record for the plurality of pairs of a key character string and the values thereof included in the notification message and registers the generated trace record in the trace table 1315.

However, if a trace record having a pair of a key character string and the values thereof that is identical to one of the plurality of pairs of a key character string and the values thereof included in the notification message has already been registered in the trace table 1315, the trace processing unit 1311 updates the trace table 1315 by appending, to the trace record, the pairs that are not included in the trace record. For example, when a trace record having SES=10 and ID=100 has already been registered and if a notification message including ID2=50, SES=10, and ID=100 is received, the registered trace record having SES=10 and ID=100 is updated into a trace record having SES=10, ID=100, and ID2=50 by appending the data "ID2=50".

Subsequently, the trace processing unit 1311 generates trace information including a pair of a key character string and the value thereof included in the updated trace record and identifies the transfer destination of the trace information using the data stored in the trace processing unit 1311 or the data stored in the identification data storage unit 141 of the trace information management apparatus 140 (S17).

For example, the data stored in the trace processing unit 1311 or the data stored in the identification data storage unit 141 of the trace information management apparatus 140 are shown in FIG. 12 or 13. In the example shown in FIG. 12, the ID (the server name) of a linking apparatus serving as a transfer destination is registered in association with a pair of a key character string and the values thereof. In this manner, transfer destinations may be registered one by one. In contrast, in the example shown in FIG. 13, a condition for determining a transfer destination and the name (the server name) of a linking apparatus are registered. As shown in FIG. 13, the condition for determining the transfer destination may be determined for each round through computation (e.g., "if the mod 10 of the value of the ID is 0").

For example, when a first trace record in FIG. 10 is registered for the first time, trace information is generated using SES=20 and ID=200. The transfer destination is determined by using one of the pairs of a key character string and the value thereof (SES=20 and ID=200) included in the trace information to which the linking apparatus is not assigned. In this example, if the linking apparatus is responsible for processing a message including SES=20, the linking apparatus 135 is selected as a transfer destination using ID=200 in the case shown in FIG. 12.

Alternatively, when a trace record having SES=20, ID=200, and ID2=50 is newly registered or updatedly registered, trace information including SES=20, ID=200, and ID2=50 is generated. Thereafter, the transfer destination is determined using ID=200. If the linking apparatus is not responsible for processing a message including ID2=50, another transfer destination is determined using ID2=50. Subsequently, the generated trace information is transferred to the two transfer destinations.

Subsequently, the trace processing unit 1311 transfers the trace information to the identified linking apparatus (S19). By exchanging the trace information, the linking apparatuses relating to the received message share the pairs of a key character string and the value thereof.

In addition, the trace processing unit 1311 increments the number of notification messages N in the corresponding trace record of the trace table 1315 by the number of the transfer destinations (S21). In the above-described first example, the number of transfer destinations is one. Accordingly, the number of notification messages N is incremented by one. When a new record is registered, the initial value is "0". Accordingly, after the value is incremented, the value is "1". In contrast, in the second example, the number of transfer destinations is two. Accordingly, the number of notification messages N is incremented by two. When an updated record is registered, the value N has already been registered. Accordingly, the existing value N is incremented by two.

By performing the above-described processing, the trace table 1315 of the linking apparatus is updated using the received message. At the same time, in order to share the information among the related linking apparatuses, the information is sent to the related linking apparatuses in the form of trace information.

Figure 14:
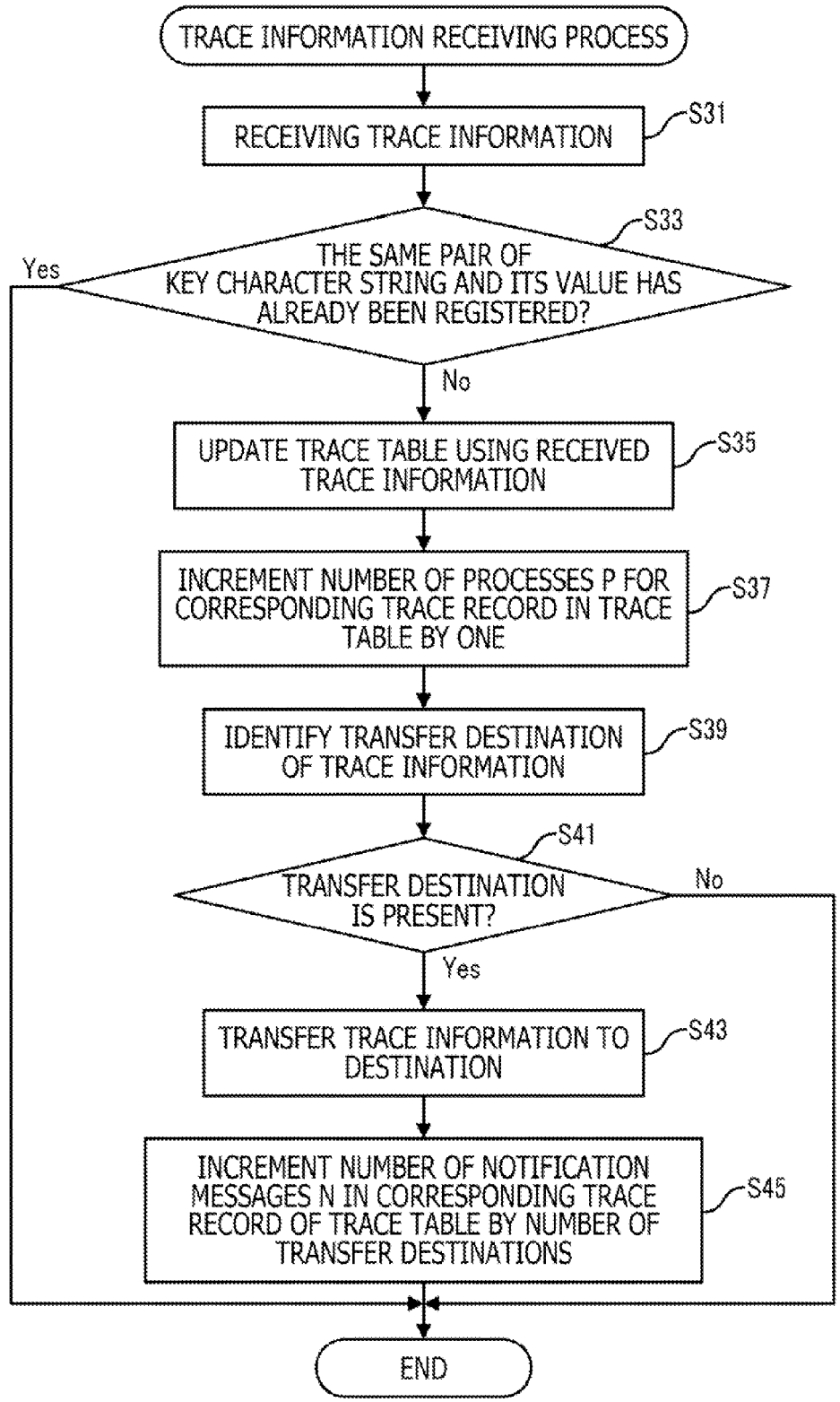
FIG. 14 is a flowchart of an example trace information receiving process.

As described above, the trace information is exchanged among the linking apparatuses. When one of the linking apparatuses receives trace information from a different linking apparatus, the processing shown in FIG. 14 is performed. Upon receiving trace information from a different linking apparatus, the trace processing unit 1311 of one of the linking apparatuses 131 to 136 (S31) stores the trace information in a storage device, such as a main memory, together with the ID of the linking apparatus that sent the trace information, for example. Thereafter, the trace processing unit 1311 determines whether a trace record having all of a plurality of pairs of a key character string and the value thereof that are identical to those included in the trace information has already been registered in the trace table 1315 (S33). If the data that are identical to those included in the trace information have already been registered in the trace table 1315, no further processing is needed. Therefore, the processing is completed.

However, if all of the data identical to those included in the trace information have not been registered in the trace table 1315, the trace processing unit 1311 updates the trace table 1315 using the received trace information (S35). Basically, this update process is similar to the trace table update process performed in S15. That is, if any one of the pairs of a key character string and the values thereof included in the trace information is not identical to any one of the pairs of a key character string and the values thereof included in the trace table 1315, the trace processing unit 1311 generates a trace record for the plurality of pairs of a key character string and the values thereof included in the trace information and registers the generated trace record in the trace table 1315. However, if a trace record having a pair of a key character string and the values thereof that is identical to one of the plurality of pairs of a key character string and the values thereof included in the trace information has already been registered in the trace table 1315, the trace processing unit 1311 updates the trace table 1315 by appending, to the trace record, the pairs that are not included in the trace record.

In addition, the trace processing unit 1311 increments the number of processes P for the corresponding trace record in the trace table 1315 by one (S37). In this way, the number of processes P is updated due to the update process performed using the trace information.

Subsequently, the trace processing unit 1311 generates trace information including a pair of a key character string and the value thereof included in the updated trace record and identifies the transfer destination of the trace information using the data stored in the trace processing unit 1311 or the data stored in the identification data storage unit 141 of the trace information management apparatus 140 (S39). Basically, this process is similar to that performed in S17. That is, among the pairs of a key character string and the value thereof included in the trace information, the trace processing unit 1311 uses the key character string and the value thereof to which the linking apparatus is not assigned and identifies the transfer destination in accordance with data shown in FIG. 12 or 13.

For example, when the trace information includes SES=20 and ID=200, the trace processing unit 1311 identifies the transfer destination by selecting one of the two pairs of a key character string and the value thereof (SES=20 and ID=200) to which the linking apparatus is not assigned. If the linking apparatus is responsible for processing a message including ID=200, the linking apparatus identifies the linking apparatus 134 as the transfer destination using SES=20 and the data shown in FIG. 12. However, if the received trace information is the same as the trace information to be transmitted, the source of the received trace information is excluded from a list of the linking apparatuses identified as the transfer destinations. Accordingly, in this example, since the linking apparatus 134 is a transfer source of the received trace information, the linking apparatus 134 is excluded from a list of the transfer destinations.

Subsequently, the trace processing unit 1311 determines whether the linking apparatus to which the trace information has not yet been sent remains in the list of transfer destinations identified in S39 (S41). If no linking apparatus remains in the list of transfer destinations, the processing is completed. However, if a linking apparatus remains in the list of transfer destinations, the trace processing unit 1311 sends the trace information to the linking apparatus (S43). In addition, the trace processing unit 1311 increments the number of notification messages N in the corresponding trace record of the trace table 1315 by the number of the linking apparatuses identified as the transfer destinations (S45).

In this way, the trace table in the linking apparatus can be updated using trace information updated when the trace table in a different linking apparatus is updated. Furthermore, when a plurality of new pairs of a key character string and the value thereof appear, trace information is sent in order to share the information by the relating linking apparatuses.

Figure 15:
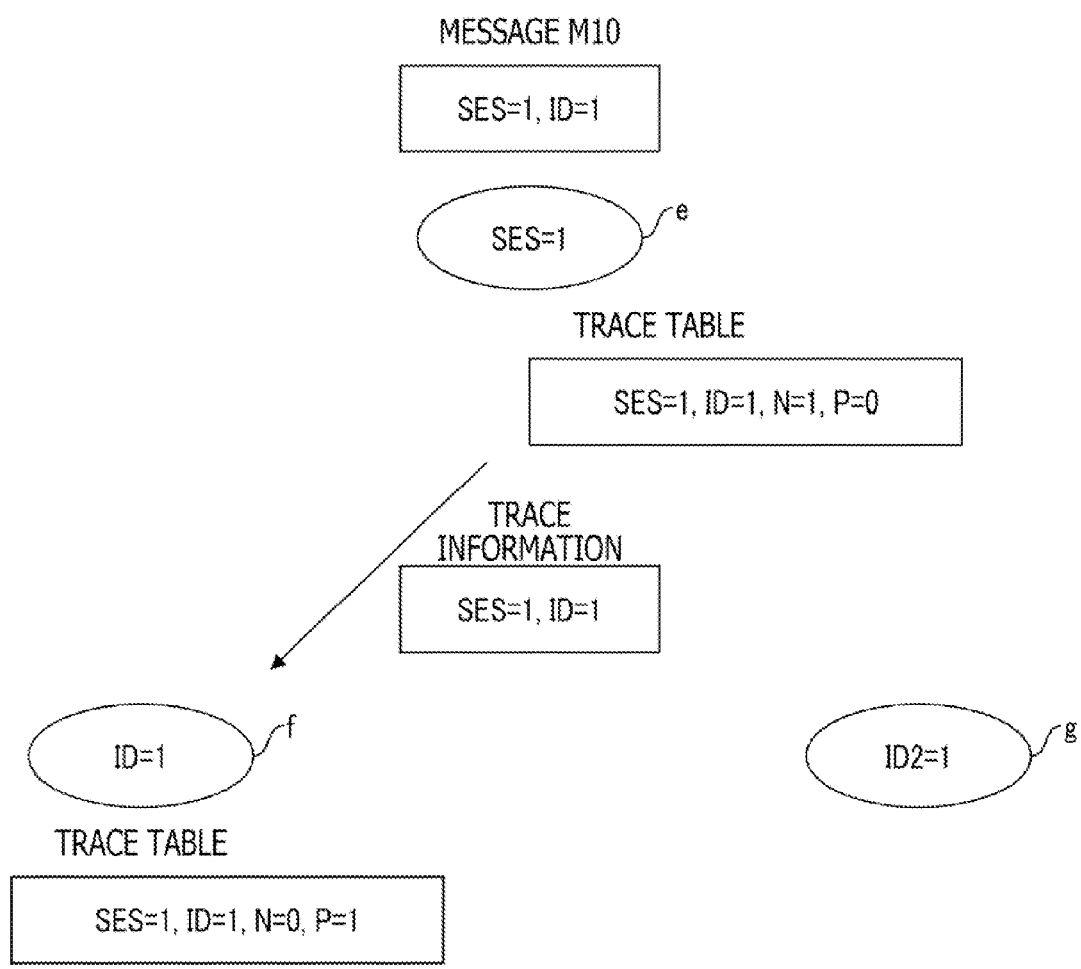
FIG. 15 illustrates an example of a trace information notifying process.

To help the readers understand the above-described process better, the process is described with reference to a specific example shown in FIGS. 15 to 18. Assume that a linking apparatus e is responsible for processing a message including SES=1. A linking apparatus f is responsible for processing a message including ID=1. A linking apparatus g is responsible for processing a message including ID2=1. The messages have not yet been dispatched. In addition, as shown in FIG. 15, when the message M10 including SES=1 and ID=1 is dispatched to the linking apparatus e, a trace record including SES=1, ID=1, the number of notification messages N=1, and the number of processes P=0 is registered in the trace table 1315. Thereafter, trace information including SES=1 and ID=1 is generated. The linking apparatus f is identified as a transfer destination of the trace information using the data "ID=1". Thus, the trace information is sent to the linking apparatus f.

Upon receiving the trace information including SES=1 and ID=1, the linking apparatus f newly registers, in the trace table 1315, the trace record including SES=1, ID=1, the number of notification messages N=0, and the number of processes P=1. Since the trace information regarding the registered trace record is the same as the received trace information, the trace information is not sent to the sender of the received trace information.

Figure 16:
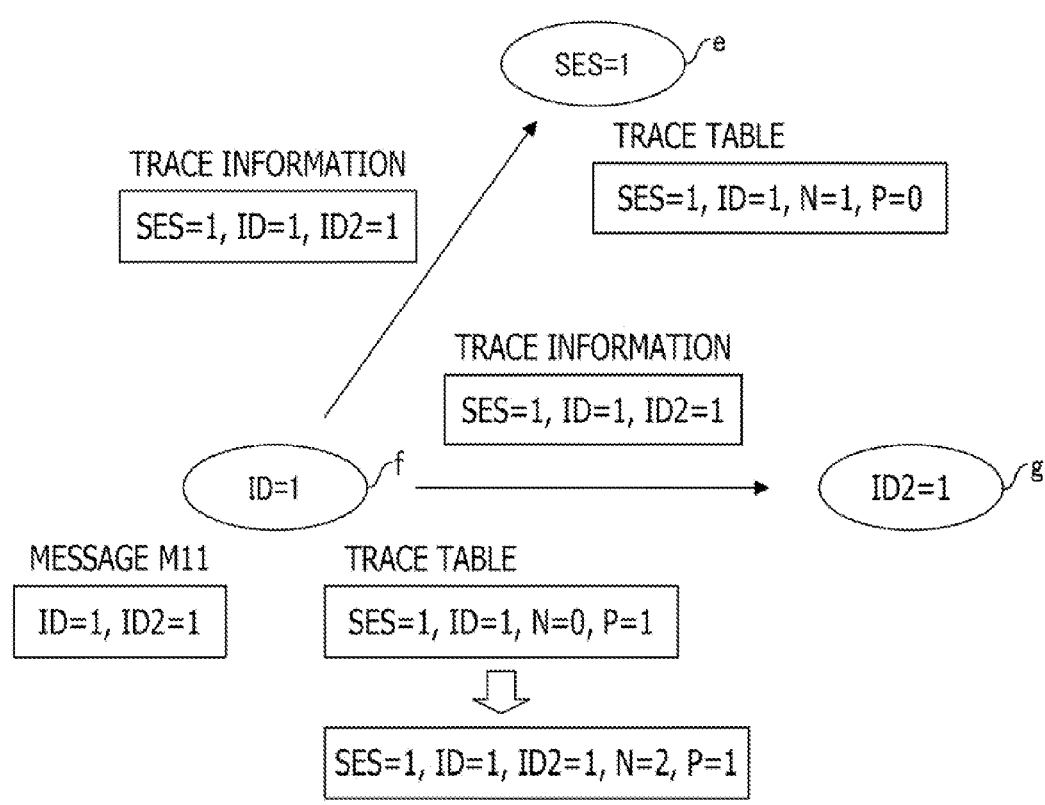
FIG. 16 illustrates an example of the trace information notifying process.

The case in which, as shown in FIG. 16, the message M11 including ID=1 and ID2=1 is dispatched to the linking apparatus f is described next. In such a case, the message M11 includes a pair of a key character string and the value thereof that is identical to the pair of a key character string and the value thereof "ID=1" included in a trace record already registered in the trace table 1315. Accordingly, the trace record is tentatively updated so as to include SES=1, ID=1, ID2=1, N=0, and P=1. Thereafter, trace information including SES=1, ID=1, and ID2=1 is generated. The destinations of the trace information are identified by using SES=1 and ID2=1 so as to be the linking apparatuses e and g. Thus, the trace information including SES=1, ID=1, and ID2=1 is sent to the linking apparatuses e and g. Thereafter, the number of notification messages N in the trace record of the trace table 1315 of the linking apparatus f is incremented by 2. As a result, N is updated to 2.

Subsequently, as shown in FIG. 17, the linking apparatus e determines that a trace record including SES=1 and ID=1 which are included in the received trace information has already been registered in the trace table 1315. Accordingly, the linking apparatus e updates the trace record so that "ID2=1" that is included in the received trace information together with SES=1 and ID=1 is appended to the trace record. In addition, since the trace record is updated in accordance with the trace information, the linking apparatus e increments the number of processes P by 1. Thus, P is updated to 1. In addition, the linking apparatus g registers, in the trace table 1315, a new trace record including SES=1, ID=1, and ID2=1 included in the received trace information. Since the number of notification messages N is 0 and the trace record is registered using the trace information, the number of processes P is updated to 1.

Figure 18:
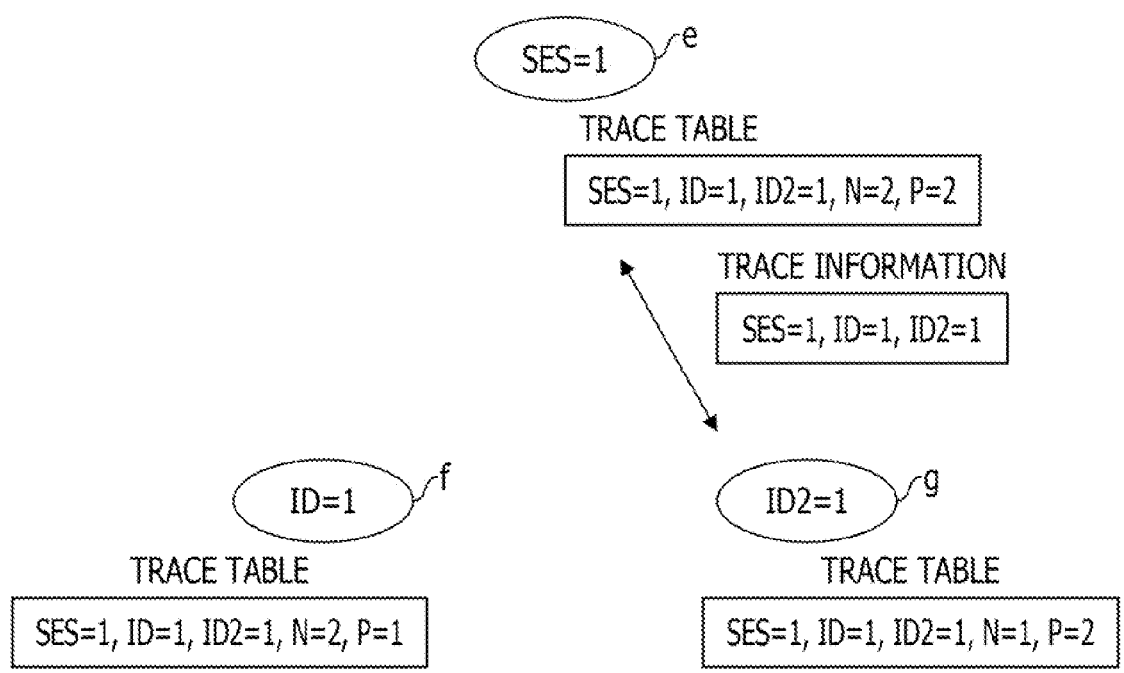
FIG. 18 illustrates an example of the trace information notifying process.

Subsequently, as shown in FIG. 18, the linking apparatus e generates trace information including SES=1, ID=1, and ID2=1 which are included in the updated trace record. However, this trace information is identical to the received trace information. Accordingly, the linking apparatus e excludes the linking apparatus f that is responsible for processing a message including "ID=1" from a list of destinations of trace information. Therefore, the generated trace information is sent from the linking apparatus e to the linking apparatus g. Similarly, the linking apparatus g generates trace information including SES=1, ID=1, and ID2=1 which are included in the newly registered trace record. However, this trace information is identical to the received trace information. Accordingly, the linking apparatus g excludes the linking apparatus f that is responsible for processing a message including "ID=1" from a list of destinations of trace information. Therefore, trace information including SES=1, ID=1, and ID2=1 is exchanged between the linking apparatus e and the linking apparatus g. However, completely the same pairs of a key character string and the value thereof have already been registered in the trace tables 1315, each of the linking apparatus e and the linking apparatus g does not update the trace table 1315. That is, exchange of trace information is completed. In addition, the number of notification messages N in the trace table 1315 of each of the linking apparatuses e and g is incremented by 1.

The number of notification messages N and the number of processes P are used to delete a trace record.

Figure 19:
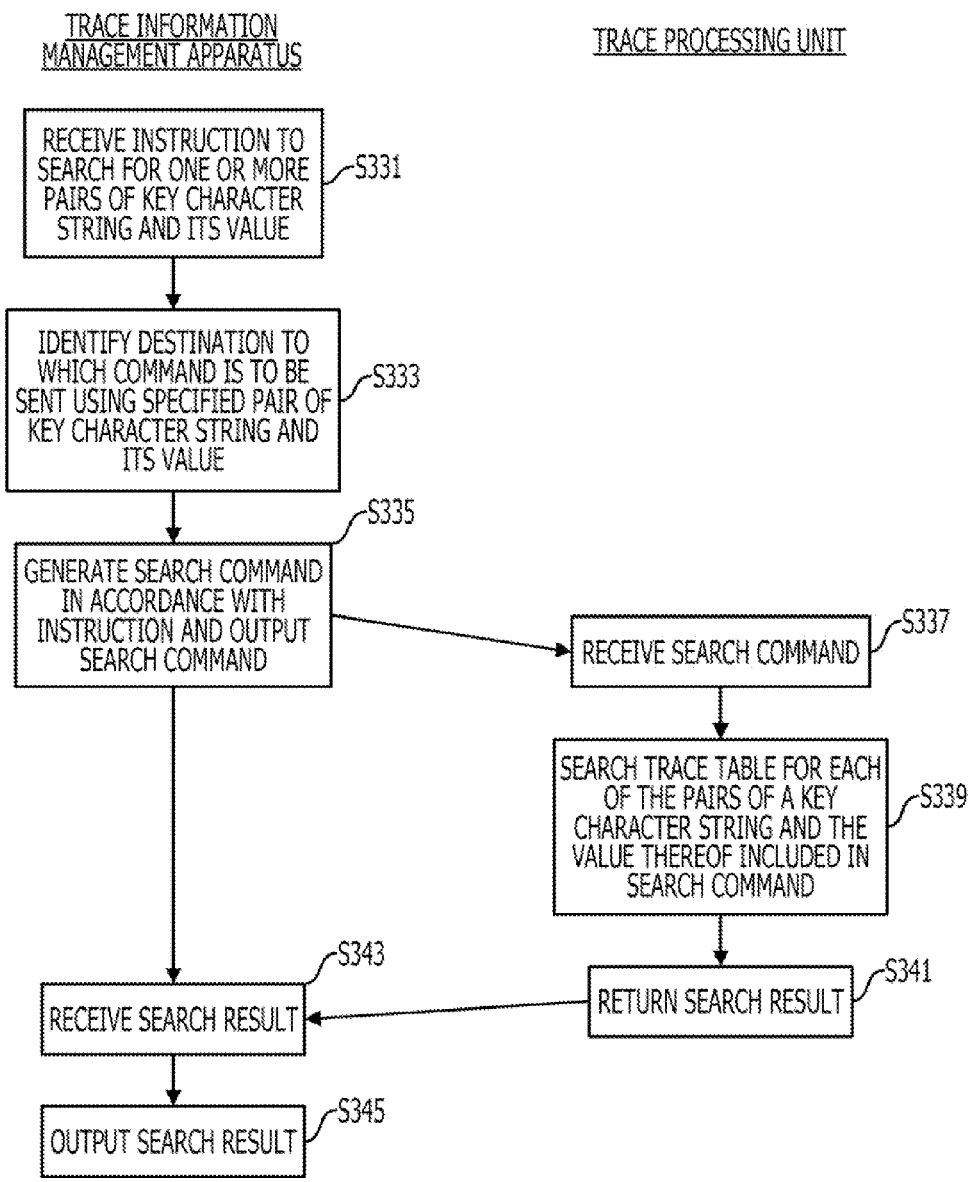
FIG. 19 is a flowchart of an example of a search process.

Example processing performed when a search command (also referred to as a "key value collection command") is output is described next with reference to FIG. 19.

For example, if a response to a request is not returned, pairs of a key character string and the value thereof that are related to an already known pair need to be identified by specifying the already known pair before the related message which has not been subjected to linking is extracted.

Accordingly, a user who analyzes the messages operates the administrator console 200 and instructs the trace information management apparatus 140 to search for the related pairs by specifying one or more pairs of a key character string and the value thereof. The trace information management apparatus 140 receives, from the administrator console 200, an instruction to search for one or more pairs of a key character string and the value thereof (S331). Thereafter, the trace information management apparatus 140 identifies a linking apparatus to which a command is to be sent in accordance with the data stored in the identification data storage unit 141 (e.g., the data shown in FIG. 12 or 13) and selected using the pairs of a key character string and the value thereof (S333). The linking apparatus that stores a message to be linked in the transaction management table 1316 also stores the same trace record in the trace table 1315. Accordingly, the linking apparatus can identify another linking apparatus for the specified pairs of a key character string and the value thereof. More specifically, when SES=10 and ID=100 are specified, the trace information management apparatus 140 sends a command to a linking apparatus identified using one of SES=10 and ID=100.

Subsequently, the trace information management apparatus 140 generates a search command including the pair of a key character string and the value thereof specified by the user and sends the generated command to the linking apparatus identified in S333 (S335). For example, the trace information management apparatus 140 outputs a command having the format "Search SES=10 ID=100". Note that the search command is used for extracting a trace record including "SES=10" or "ID=100".

Upon receiving the search command from the trace information management apparatus 140 (S337), the trace processing unit 1311 searches the trace table 1315 for each of the pairs of a key character string and the value thereof included in the search command (S339). Thereafter, the trace processing unit 1311 returns the result of the searching operation to the trace information management apparatus 140 (S341). The result of the search operation contains the pair of a key character string and the value thereof serving as the search key followed by a list of found pairs of a key character string and the value thereof.

Upon receiving the result of the search operation from the trace processing unit 1311 (S343), the trace information management apparatus 140 outputs the search result on the administrator console 200 (S345). In this way, the user can know the pairs of a key character string and the value thereof included in a message to be extracted.

For example, when a command "Search SES=10" is output to a linking apparatus identified as a transfer destination, the search result "SES=10, ID=100" is obtained using the trace table 1315 shown in FIG. 10.

Figure 20:
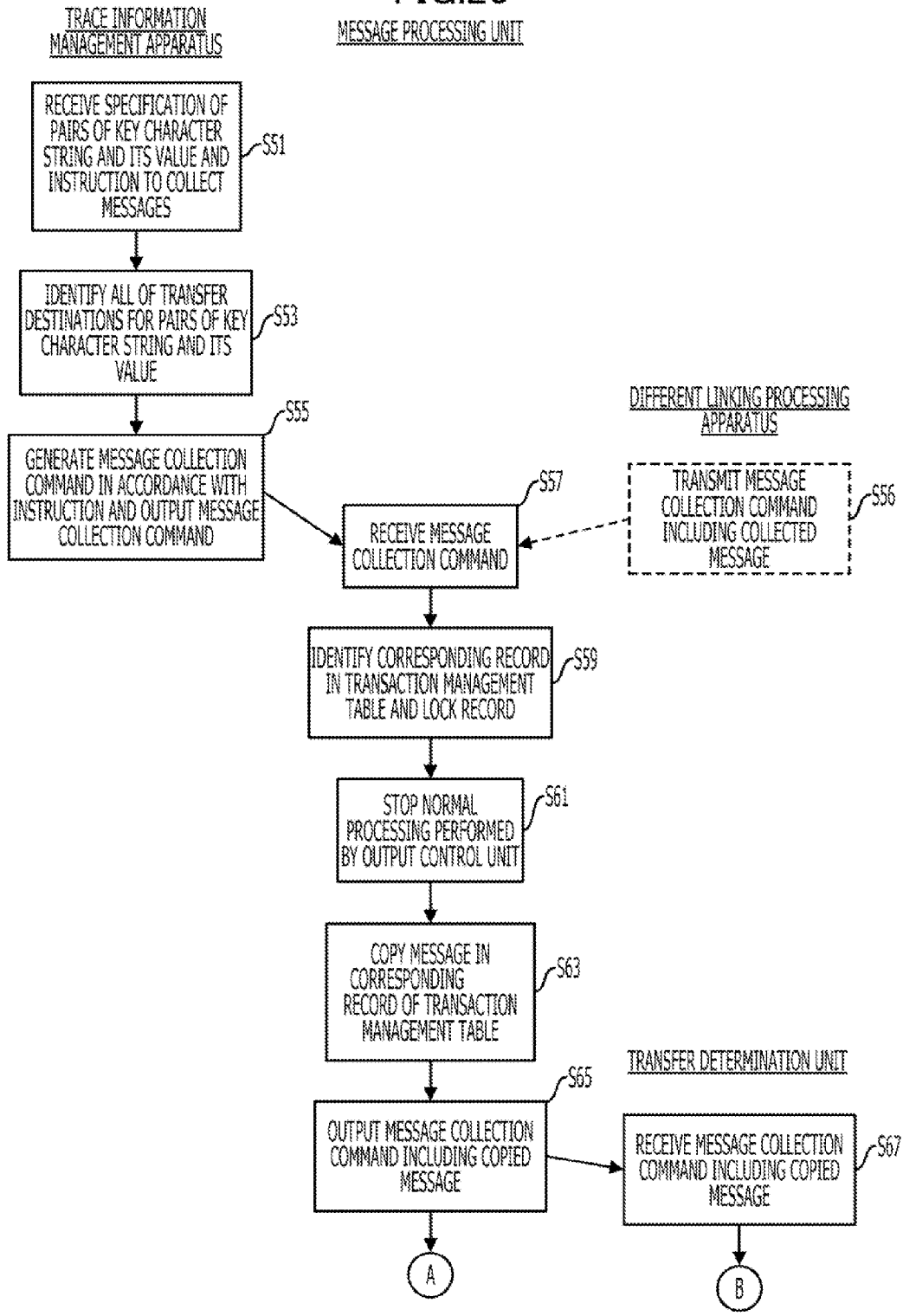
FIG. 20 is a flowchart of an example of a message collection process.

Example processing performed when messages are collected is described next with reference to FIGS. 20 to 22.

The user who analyzes the messages operates the administrator console 200 and specifies a pairs of a key character string and the value thereof included in a message to be extracted and instructs the trace information management apparatus 140 to collect the message. The trace information management apparatus 140 receives the specification of the pairs of a key character string and the value thereof and the instruction to collect the messages (S51). Thereafter, the trace information management apparatus 140 identifies all of the transfer destinations for the pairs of a key character string and the value using data stored in the identification data storage unit 141 (refer to FIG. 12 or 13) (S53). For example, when "SES=10" and "ID=100" are specified, the trace information management apparatus 140 identifies linking apparatuses that are responsible for processing a message including "SES=10". In addition, the trace information management apparatus 140 identifies linking apparatuses that are responsible for processing a message including "ID=100".

Subsequently, the trace information management apparatus 140 generates a message collection command in accordance with a pair of a key character string and the value thereof and sends the generated message collection command to one or more linking apparatuses identified in S53 (S55). For example, a command having the format "Collect ID=100 SES=10" is generated.

The message processing unit 1312 receives the message collection command from the trace information management apparatus 140 (S57). Note that, as described below in more detail, the message collection command is transferred to a different linking apparatus. Accordingly, the output control unit 1314 of the different linking apparatus may transmit a message collection command including the collected messages (S56), and the message processing unit 1312 of the linking apparatus which is a destination of the message collection command may receive the message collection command (S57).

Subsequently, the message processing unit 1312 identifies, in the transaction management table 1316, a management record corresponding to the pair of a key character string and the value thereof included in the message collection command and to which the linking apparatus is assigned. Thereafter, the message processing unit 1312 locks the management record (S59). If the management record is not locked, a new received message may be registered during the message collecting operation, and the registered message may satisfy the condition of the linking rule. In such a case, the message may be output to a different linking apparatus. For that reason, the management record is locked, and message collection is performed first.

In addition, the message processing unit 1312 stops the normal processing performed by the output control unit 1314 (S61). This is because, like the locking operation, it prevents the output control unit 1314 from extracting a message from the transaction management table 1316 and transmitting the extracted message. Thereafter, the message processing unit 1312 copies the message in the corresponding management record of the transaction management table 1316 (S63). For example, when the message collection command "Collect ID=100 SES=10" is received, the message processing unit 1312 of a linking apparatus that is responsible for processing a message including "SES=10" copies the message M3 and M5 registered in the second management record of the transaction management table 1316 shown in FIG. 8.

Subsequently, the message processing unit 1312 outputs a message collection command including the copied message to the transfer determination unit 1313 (S65). The transfer determination unit 1313 receives the message collection command including the copied message from the message processing unit 1312 (S67). Thereafter, the processing proceeds to the process shown in FIG. 21 via connectors A and B.

Figure 21:
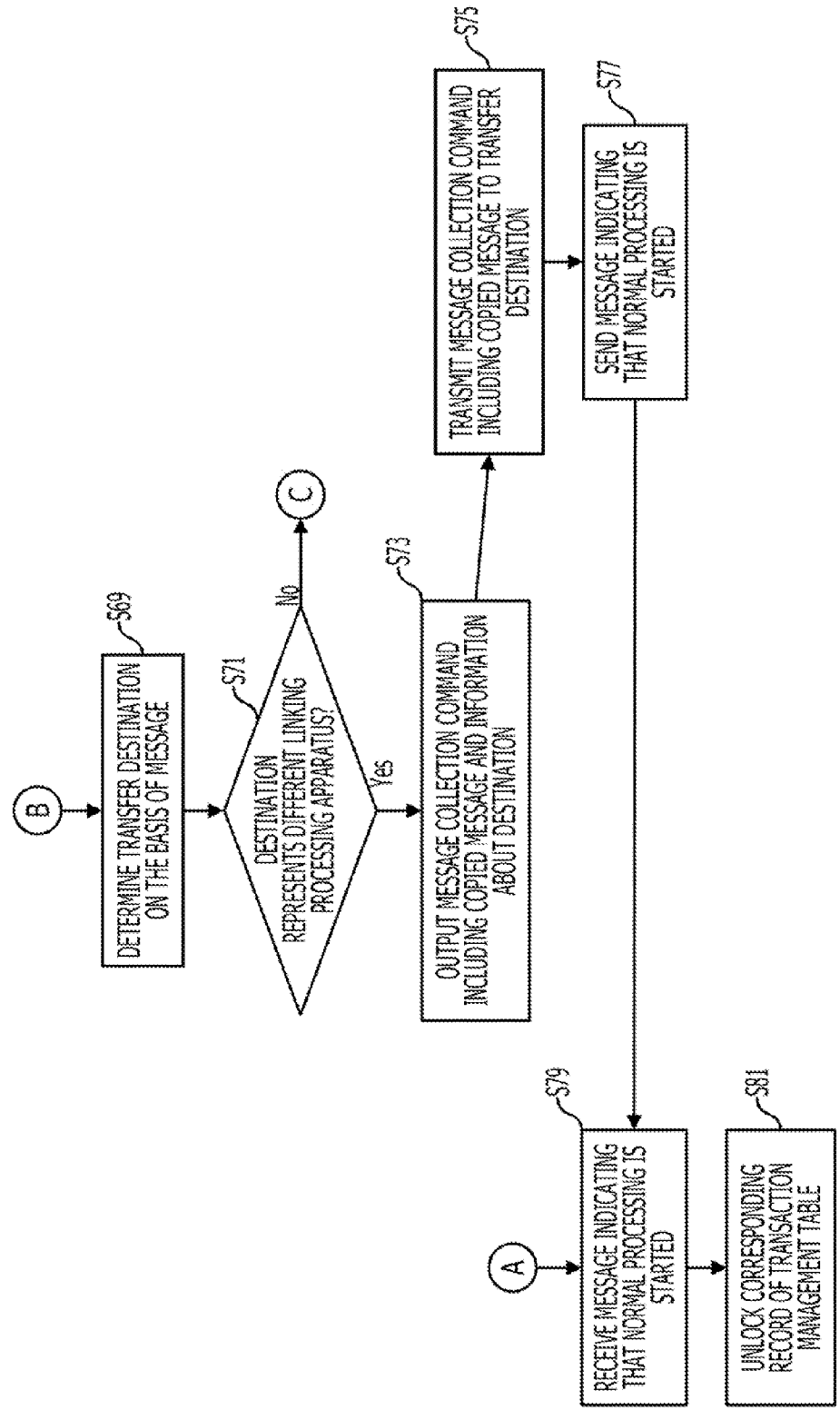
FIG. 21 is a continuation of the flowchart shown in FIG. 20.
Figure 22:
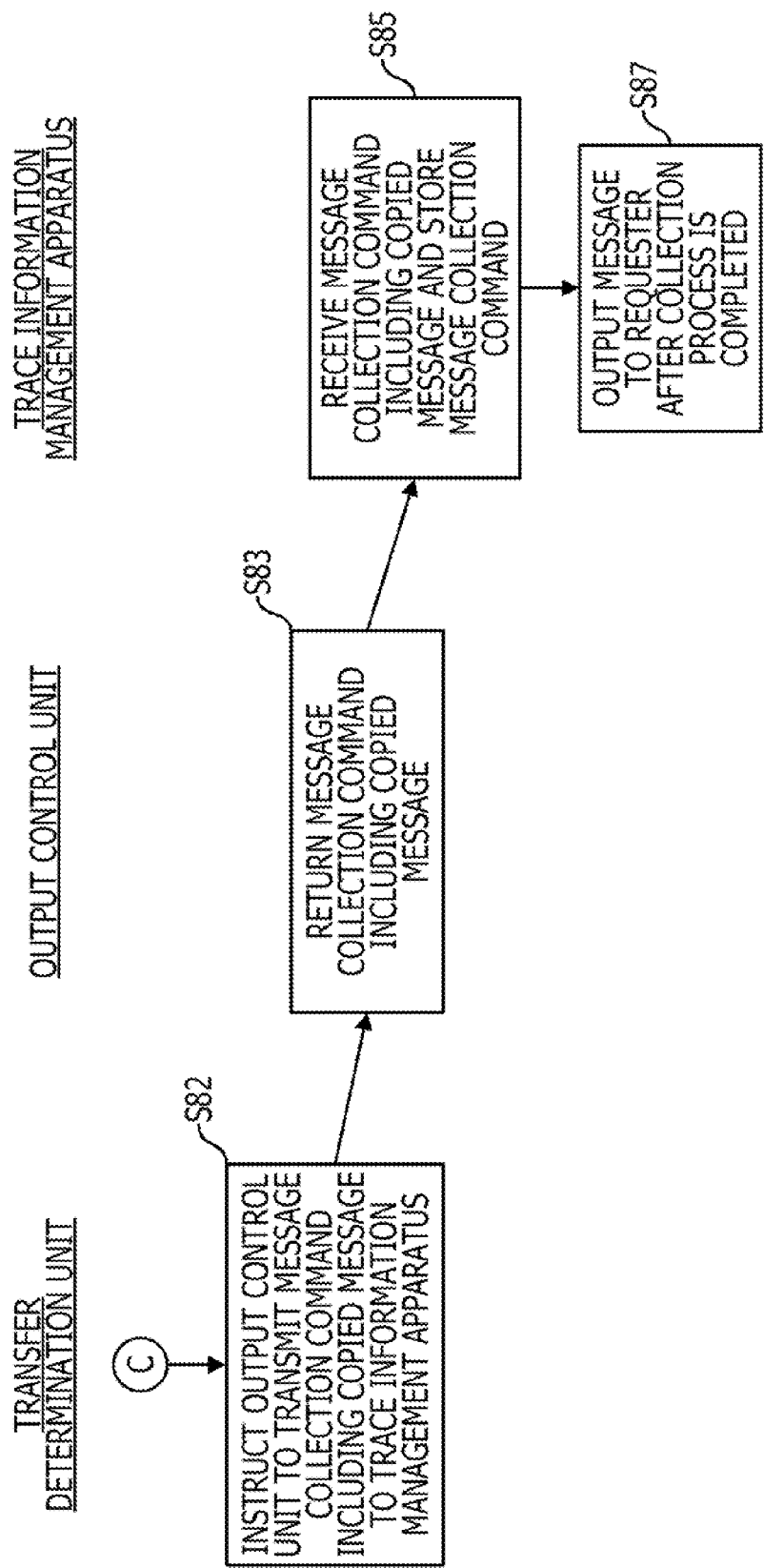
FIG. 22 is a continuation of the flowchart shown in FIG. 21.
Figure 23:
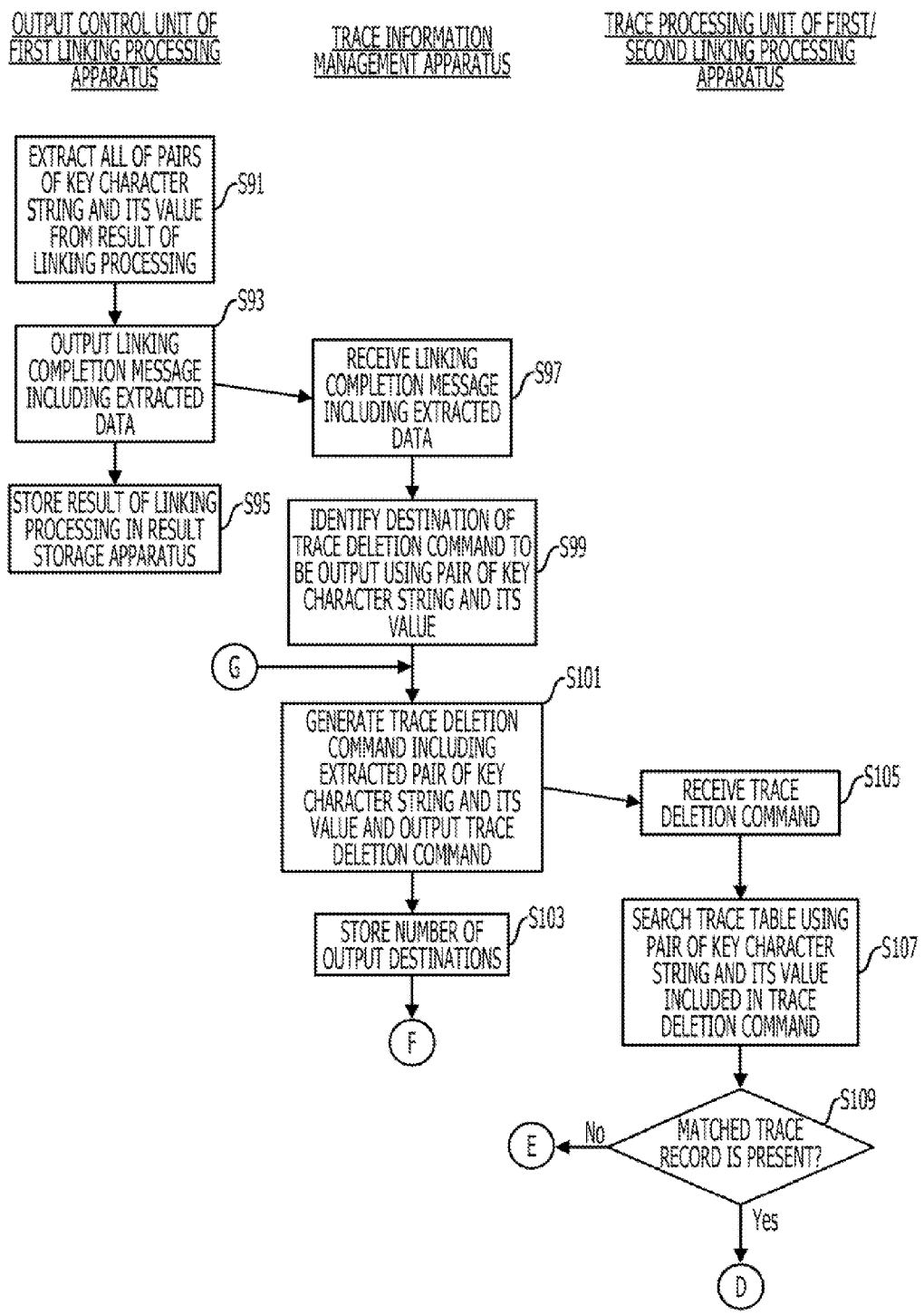
FIG. 23 is a flowchart of an example of a trace deletion process.

As shown in FIG. 21, the transfer determination unit 1313 determines the transfer destination in accordance with the pair of a key character string and the value thereof included in the message copied in S63 and the linking rule stored in the linking rule storage unit 1317 (S69).

For example, in the above-described example, when a linking apparatus that is assigned to "SES=10" receives a message collection command for the first time, the linking apparatus selects a linking apparatus that is assigned to "ID=100" which is included in the message M3 copied by the linking apparatus as a linking apparatus at a destination. In contrast, when a linking apparatus that is assigned to "ID=100" receives a message collection command and if the message collection command does not include a message, the linking apparatus may select a linking apparatus that is assigned to a pair of a key character string and the value thereof that is included in the message extracted from the transaction management table 1316 and to which the linking apparatus is not assigned (i.e., SES=10) as a linking apparatus at a destination. However, the same message collection command is transferred from the linking apparatus that is responsible for processing a message including "SES=10". Accordingly, the trace information management apparatus 140 may be selected as a transfer destination, as in the case in which the command is not transferred to a different linking apparatus if a normal linking rule is satisfied.

Note that when a message collection command includes a plurality of pairs of a key character string and the value thereof (e.g., "Collect SES=10 ID=100 ID2=50"), it is difficult to identify through which linking apparatus assigned to one of the pairs the message passes. Accordingly, in order to prevent the message collection command from being transferred to the same linking apparatus, the message collection command includes the ID of a linking apparatus through which the message has passed. For example, the ID of a linking apparatus may be included in association with a collected message.

Subsequently, the transfer determination unit 1313 determines whether the destination represents a different linking apparatus (S71). If the destination represents the trace information management apparatus 140, the processing proceeds to the process shown in FIG. 22 via a connector C. However, if the destination represents a different linking apparatus, the transfer determination unit 1313 outputs the message collection command including the copied message and the name of the destination to the output control unit 1314 (S73).

Upon receiving the message collection command and the data regarding the destination from the transfer determination unit 1313, the output control unit 1314 outputs a message collection command including the copied message to the linking apparatus at the destination (S75). In addition, the output control unit 1314 sends, to the message processing unit 1312, a message indicating that normal processing is started (S77).

Upon receiving the message indicating that normal processing is started from the output control unit 1314 (S79), the message processing unit 1312 unlocks the corresponding record of the transaction management table 1316 (S81). In this way, the message processing unit 1312 returns to a mode in which normal linking is performed.

The processing performed subsequent to the connector C is described next with reference to FIG. 22. The transfer determination unit 1313 instructs the output control unit 1314 to return the message collection command including the copied message to the trace information management apparatus 140 (S82). The output control unit 1314 receives the message collection command including the copied message from the transfer determination unit 1313 and returns the message collection command to the trace information management apparatus 140 (S83). Upon receiving the message collection command including the copied message from the linking apparatus, the trace information management apparatus 140 stores the message collection command in, for example, a storage device, such as a main memory (S85). Since a number of message collection commands equal to the number of the transmitted message collection commands are returned, the collection process is completed when all of the message collection commands are returned. If the same message is received after the collection process is completed, the trace information management apparatus 140 merges the duplicate messages and outputs the received message to the administrator console 200 (S87). Note that when the message collection command "Collect SES=10 ID=100) is separately output to a linking apparatus that is responsible for processing a message including "SES=10" and a linking apparatus that is responsible for processing a message including "ID=100" and if the above-described transfer processing is performed, the message may be duplicated since the two message collection commands are returned to the trace information management apparatus 140 through the same linking apparatus.

Through such processing, all of the messages that are stored in the linking apparatuses in a distributed manner can be collected.

Note that if it is known that a message to be linked includes a key character string and the value thereof specified therein (e.g., "Collect SES=10 ID=100), the message collection command can be sent to the linking apparatus that is responsible for processing a message including "SES=10" or the linking apparatus that is responsible for processing a message including "ID=100" and transferred using the above-described algorithm. Thus, all of the messages can be collected at one time using a snowball effect. However, key strings and the values that are not related to each other (e.g., SES=10 and ID=200) may be specified. Accordingly, as described above, the trace information management apparatus 140 sends a message collection command to a linking apparatus at a destination selected for each of the pairs of a key character string and the value thereof.

A delete process of a trace record of the trace table 1315 is described next. The trace table 1315 includes a pair of a key character string and the value thereof for a message that has not yet been linked. Accordingly, after the message is linked, the trace record for the message is not needed. Therefore, through the processes illustrated in FIGS. 23 and 24, maintenance of the trace table 1315 is performed.

When the output control unit 1314 stores a message group in the linking result storage apparatus 150 in accordance with the linking rule, the output control unit 1314 extracts all of pairs of a key character string and the value thereof from a message included in the result of a linking operation (S91). Thereafter, the output control unit 1314 transmits a linking completion message including the extracted data to the trace information management apparatus 140 (S93). As described above, the output control unit 1314 stores the result of a linking operation in the linking result storage apparatus 150 (S95). The trace information management apparatus 140 receives a linking completion message including a pair of a key character string and the value thereof for a message included in the result of a linking operation from one of the linking apparatuses (S97).

Thereafter, the trace information management apparatus 140 identifies the destination of a trace deletion command using the extracted pair of a key character string and the value thereof and the data stored in the identification data storage unit 141 (e.g., the data shown in FIG. 12 or 13) (S99). For example, if the key character string and value thereof are SES=10 and ID=100, the linking apparatus that is responsible for processing a message including SES=10 and the linking apparatus that is responsible for processing a message including ID=100 are identified.

Subsequently, the trace information management apparatus 140 generates a trace deletion command (a Delete command) including the extracted pair of a key character string and the value thereof and outputs the generated command to the destination identified in S99 (step S101). For example, the trace information management apparatus 140 outputs a command having the format "Delete ID=100 SES=10". The trace information management apparatus 140 stores the number of the destinations in a storage device, such as a main memory (S103).

Upon receiving the trace deletion command including the pair of a key character string and the value thereof (S105), the trace processing unit 1311 of the linking apparatus identified as a destination searches the trace table 1315 using the pair of a key character string and the value thereof included in the trace deletion command (S107). A trace record including one of the pairs of a key character string and the value thereof is searched for in the trace table 1315.

The trace processing unit 1311 determines whether a corresponding trace record is present (S109). If a corresponding trace record is not present, the processing proceeds to the process illustrated in FIG. 24 via a connector E. However, if a corresponding trace record is present, the processing proceeds to the process illustrated in FIG. 24 via a connector D.

Figure 24:
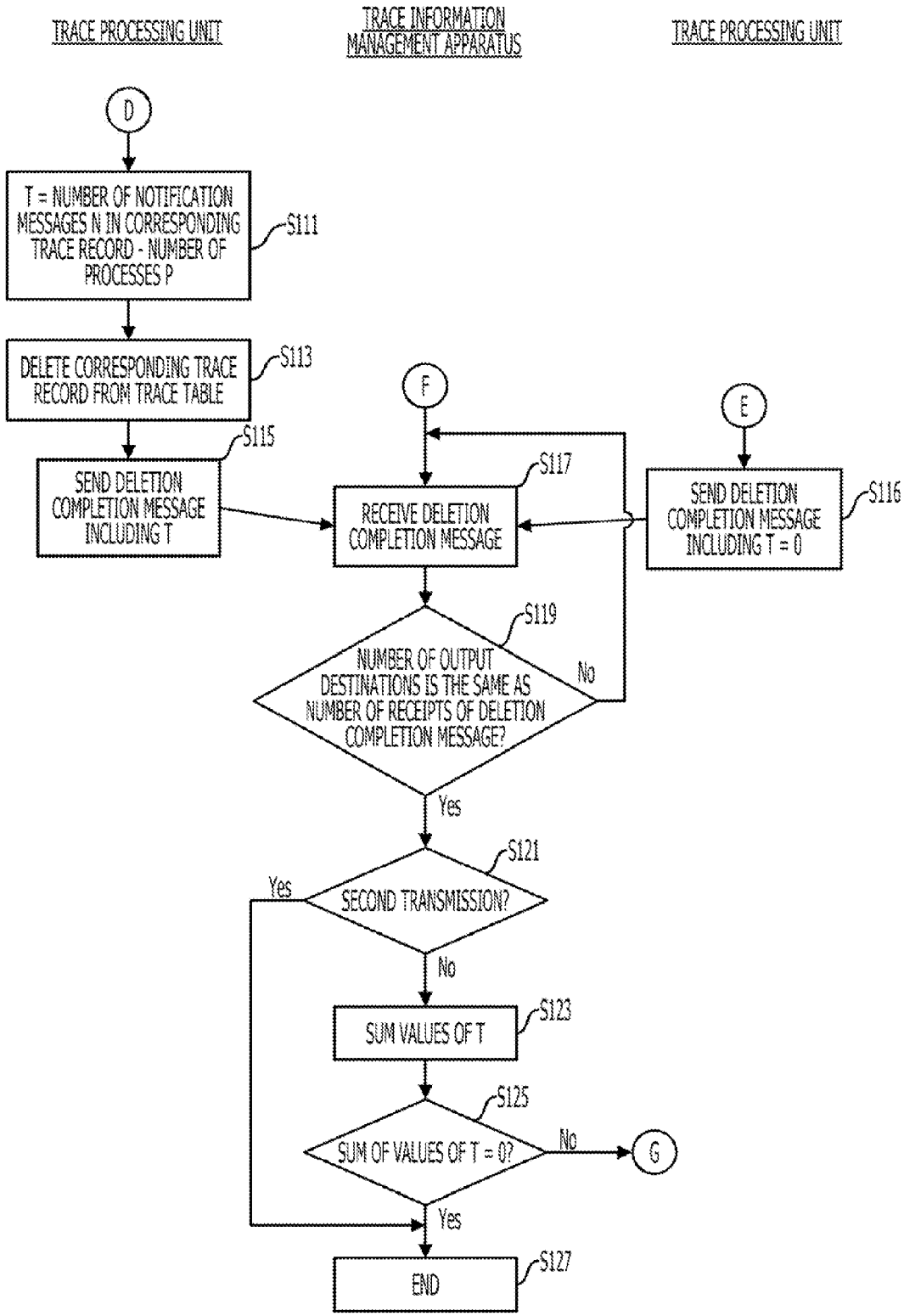
FIG. 24 is a continuation of the flowchart shown in FIG. 23.

Note that the processing performed by the trace information management apparatus 140 proceeds to the process illustrated in FIG. 24 via a connector F.

When the processing proceeds to the process illustrated in FIG. 24 via a connector D, the trace processing unit 1311 computes a difference T between the number of notification messages N and the number of processes P for the trace record obtained through the search operation (S111) and deletes the trace record from the trace table 1315 (S113). Thereafter, the trace processing unit 1311 sends a deletion completion message including the difference T to the trace information management apparatus 140 (S115).

Upon receiving the deletion completion message from the linking apparatus (S117), the trace information management apparatus 140 increments the number of received deletion completion messages by one and determines whether the number of destinations stored in S103 is the same as the number of received deletion completion messages (S119). If the number of destinations stored in step S103 is larger than the number of received deletion completion messages, the processing returns to S117. Note that a plurality of linking completion messages may be processed at the same time. Accordingly, for example, an ID may be assigned to a trace deletion command, and the ID may be included in the deletion completion message. In this way, the determination in S119 is made for the same linking completion messages.

However, if the number of destinations is larger or the same as the number of received deletion completion messages, the trace information management apparatus 140 further determines whether a second trace deletion command is transmitted for the same linking completion message (S121). If a first trace deletion command is transmitted, the trace information management apparatus 140 computes the sum of the differences T contained in all of the deletion completion messages (S123). However, if a second trace deletion command is to be transmitted, the processing is completed (S127).

For example, in the example shown in FIGS. 15 to 18, as shown in FIG. 18, N=2 and P=2 for the linking apparatus e. In addition, N=2 and P=1 for the linking apparatus f. N=1 and P=2 for the linking apparatus g. In the entire system, the number of transmissions of trace information is the same as the number of processes. Accordingly, as described above, the sum of T is 0. In the example shown in FIG. 18, T=2−2=0 for the linking apparatus e. T=1−2=1 for the linking apparatus f. T=2−1=1 for the linking apparatus g. Thus, the sum of Ts is zero. However, if a problem occurred in the processing of the trace information or in the processing of trace deletion, the sum of Ts may not be zero.

Accordingly, the trace information management apparatus 140 determines whether the sum of Ts is zero (S125). If the sum of Ts is not zero, the processing returns to S101 shown in FIG. 23 via the connector G. That is, the trace information management apparatus 140 receives a trace deletion command once more. The trace information management apparatus 140 embeds data indicating second transmission into the second trace deletion command. However, if the sum of Ts is zero, the processing is completed (S127).

Note that if a corresponding trace record is not present (i.e., in the case of processing through the connector E), the trace processing unit 1311 sends the deletion completion message including T=0 to the trace information management apparatus 140 (S116). In general, such a case occurs when a second trace deletion command is sent. Subsequently, the above-described processing subsequent to S117 is performed. In a normal case, it is determined in S121 that a second trace deletion command is sent and, therefore, the processing is completed.

Through the above-described processing, an unnecessary trace record can be deleted from the trace table 1315. Thus, the capacity of the trace table 1315 of each of the linking apparatuses can be maintained at an appropriate level.

Through the above-described processing, even a message that has not been subjected to linking can be efficiently collected. For example, when a response to a request is not returned, the cause can be recognized from the progress of processing.

Alternatively, the trace information management apparatus 140 may manage all of the trace tables. However, since the trace tables are updated frequently, the update processing may create a bottleneck and, therefore, sufficient throughput cannot be obtained. The above-described distributed processing addresses and/or solves such a problem, and the update processing of the trace tables can be efficiently performed. In addition, since the size of each of the trace tables does not become too large, the distributed management of the trace tables is cost-effective.

While the present technique has been described with reference to the example embodiments, the present technique is not limited thereto. For example, the functional block diagram of the linking apparatus shown in FIG. 7 is only an example. Other structures of program modules can be employed.

Furthermore, if the result of processing is the same, the flow of processing may be changed. For example, the steps may be performed in parallel or in a different order.

Figure 25:
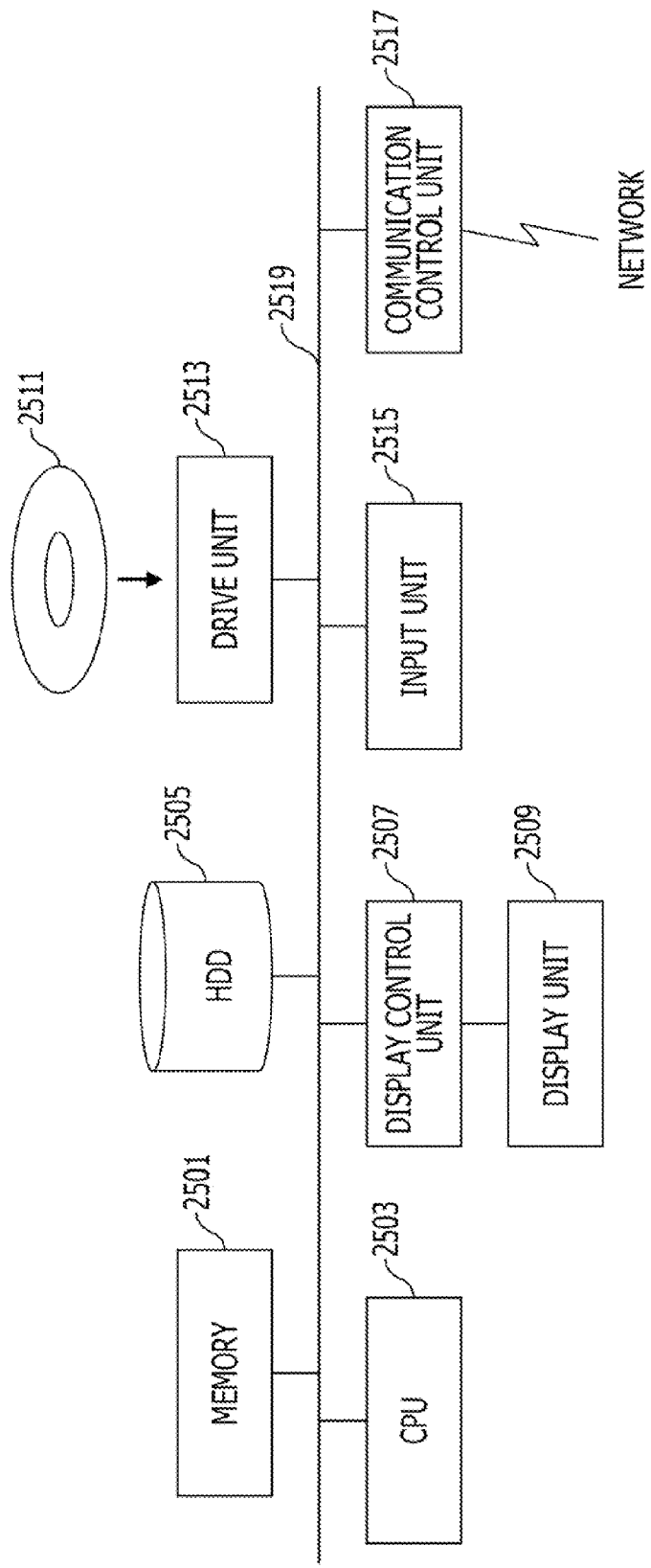
FIG. 25 is a block diagram illustrating the configuration of a computer.

Note that each of the linking apparatuses 131 to 136, the message receiving apparatus 110, the message dispatching apparatus 120, and the trace information management apparatus 140 of the above-described parallel linking system 100 is formed from a computer apparatus. As shown in FIG. 25, the computer apparatus includes a memory 2501, a central processing unit (CPU) 2503, a hard disk drive (HDD) 2505, a display control unit 2507 connected to a display unit 2509, a drive unit 2513 for a removable disk 2511, an input unit 2515, and a communication control unit 2517 for connecting the computer apparatus to a network are connected via a bus 2519. An operating system (OS) and application programs for realizing the processes of the embodiment(s) are stored in the HDD 2505. When the application programs are executed by the CPU 2503, the application programs are loaded from the HDD 2505 into the memory 2501. The CPU 2503 controls the display control unit 2507, the communication control unit 2517, and the drive unit 2513 as needed so that the units appropriately operate. In addition, data in process are stored in the memory 2501 and is moved into the HDD 2505 as needed. According to the embodiment(s), the application programs for executing the above-described processes are stored in the computer-readable removable disk 2511 and are distributed. Thereafter, the application programs are installed in the HDD 2505 via the drive unit 2513. Alternatively, the application programs may be installed in the HDD 2505 via a network, such as the Internet, and the communication control unit 2517. In such a computer apparatus, hardware (e.g., the CPU 2503 and the memory 2501), the OS, and the application programs organically cooperate so as to realize the above-described units and various functions.

The above-described embodiments are summarized as follows.

The parallel linking system includes a plurality of linking apparatuses each linking related messages to one another. Each of the linking apparatuses includes a trace data storage unit that stores a trace record including a plurality of pairs of a key character string and the value thereof included in the messages, a trace processing unit, a message storage unit that stores data of a message that has not been subjected to linking (for example, the message storage unit may store the message in the form of a transaction management table), and a message processing unit. In addition, the trace processing unit identifies a plurality of pairs of a key character string and a value thereof included in a plurality of messages that have not been subjected to linking and that are to be subjected to linking from a message assigned to the linking apparatus or trace information including a plurality of pairs of the key character string and the value thereof received from a different linking apparatus. Thereafter, the trace processing unit performs a trace data storage unit updating process so that the identified pair is stored in the trace data storage unit as a new trace record or an existing trace record that includes some of the pairs is updated. Furthermore, the trace processing unit transmits, as trace information, a pair of a key character string and a value thereof included in the newly registered or updated trace record to a linking apparatus identified using the trace information and a predetermined first rule. Still furthermore, upon receiving a search command including a first pair of a key character string and a value thereof, the trace processing unit searches the trace data storage unit using the first pair and returns the data of a found trace record to the source of the search command. In contrast, upon receiving a message collection command including a second pair of a key character string and a value thereof, the message processing unit searches the message storage unit using the second pair and transmits a message collection command including a found message to a linking apparatus identified using a predetermined second rule or the source of the message collection command.

In this way, by not only using a received message to which the linking apparatus is assigned but also exchanging trace information between the linking apparatuses, a plurality of pairs of a key character string and a value thereof included in a plurality of messages that have not been subjected to linking and that are to be subjected to linking can be collected in the trace data storage unit. Accordingly, if a response to a request is not returned, a user can identify which pair of a key character string and a value thereof is to be used in order to search for a message in the trace data storage unit even for a message that has not been subjected to linking. That is, a corresponding message can be efficiently collected from the corresponding linking apparatus.

When processing the message collection command, the message processing unit may stop a process of reading a message that has already been subjected to linking from the message storage unit in accordance with a predetermined linking rule and outputting the readout message. In this way, the message can be prevented from being transferred to a different linking apparatus due to linking of a message simultaneously performed.

Furthermore, the parallel linking system may further include a trace information management apparatus and a linking result storage apparatus. In such a case, each of the linking apparatuses may output, to a different linking apparatus, a particular group of messages stored in the message storage unit and linked using the second rule and a pair of a key character string and the value thereof or store the particular message group in the linking result storage apparatus. When the linking apparatus stores the particular message group in the linking result storage apparatus, the linking apparatus may further include an output control unit that sends a linking completion message including the pairs of a key character string and the value thereof included in the particular message group and a third plurality of pairs to the trace information management apparatus. In addition, the trace record stored in the trace data storage unit may further include a number N of sent notification messages including trace information having the pair of a key character string and the value thereof included in the trace record and the number of processes performed when the trace information is received. In such a case, upon receiving a linking completion message from the output control unit of one of the plurality of linking apparatuses, the trace information management apparatus may transmit a deletion command including the third plurality of pairs of a key character string and the value thereof included in the linking completion message to a linking apparatus identified using the third plurality of pairs and the second rule. Furthermore, upon receiving the deletion command, the trace processing unit of the linking apparatus may search the trace data storage unit using the third plurality of pairs included in the deletion command, identify the trace record, and delete the identified trace record. Thereafter, the trace processing unit may transmit, to the trace information management apparatus, a deletion completion message including a difference between the number of notification messages included in the trace record and the number of processes. Still furthermore, upon receiving the deletion completion messages corresponding to all of the deletion commands, the trace information management apparatus may determine whether the sum of the differences included in the deletion completion messages is zero. If the sum is not zero, the trace information management apparatus may transmit the deletion command again.

In this way, when the linking is completed, unnecessary records can be deleted from the trace data storage unit of each of the linking apparatuses.

In addition, in the trace data storage unit updating process, if all of the pairs of a key character string and the values thereof included in the received message that is assigned to the linking apparatus are not included in the trace record stored in the trace data storage unit, a trace record including all of the pairs may be newly registered in the trace data storage unit. In contrast, if some of the pairs are included in any one of the trace records stored in the trace data storage unit, the other unmatched pairs may be appended to the trace record. Furthermore, when trace information including a fourth plurality of pairs of a key character string and the values thereof are received from a different linking apparatus and if all of the fourth pairs of a key character string and the values thereof included in the trace information are not included in the trace record stored in the trace data storage unit, a trace record including all of the fourth pairs may be newly registered in the trace data storage unit. In contrast, if some of the fourth pairs are included in any one of the trace records stored in the trace data storage unit, the other unmatched fourth pairs may be appended to the trace record.

In addition, a program that causes a computer to perform the above-described processes can be generated. The program is stored in a computer-readable recording medium (storage) such as a flexible disk, a compact disc-read only memory (CD-ROM), a magnetooptical disk, a semiconductor memory, or a hard disk wherein a signal per se is not included in the computer-readable recording medium. Note that data in process is tentatively stored in a storage device, such as a memory of a computer.

According to the above-described embodiments, when a plurality of linking apparatuses simultaneously perform linking, a message that has not yet been subjected to the linking can be automatically extracted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A computer-readable recording medium storing a program that causes a computer that serves as a linking apparatus to link related messages, execution of the program causes the computer to execute a procedure, the procedure comprising:
   receiving a message or trace information;
   selecting, from the received message or the trace information, a plurality of pairs of a key character string and value thereof, the plurality of pairs being used to link related messages;
   registering the selected pairs in a trace data storage unit of the computer as a new trace record or updating an existing trace record that includes some of the selected pairs;
   identifying a transfer destination for the pairs included in the newly registered or updated trace record based on a first rule;
   transmitting, as outgoing trace information, the pairs to the identified transfer destination;
   when receiving a search command including a first pair of a key character string and value thereof, searching the trace data storage unit of the computer using the first pair and returning data of a found trace record to a source of the search command,
   when receiving a message collection command including a second pair of a key character string and value thereof, searching the transaction management table storage unit of the computer using the second pair and transmitting the message collection command including a found message to one of a linking apparatus identified using a second rule and a source of the received message collection command.

2. The computer-readable recording medium according to claim 1, wherein the procedure further includes, when processing the message collection command, stopping a process of reading, out of the transaction management table storage unit, a message that has already been subjected to linking in accordance with a linking rule and outputting the message.

3. The computer-readable recording medium according to claim 1, wherein the received message is assigned to the linking apparatus.

4. The computer-readable recording medium according to claim 1, wherein the received trace information is received from another linking apparatus.

5. The computer-readable recording medium according to claim 1, wherein the transfer destination is another linking apparatus.

6. The computer-readable recording medium according to claim 1, wherein the first rule is a prioritization rule indicating a priority associated with each of the character strings, and the identifying identifies the transfer destination of for the pairs based on a pair having a highest priority according to the first rule.

7. The computer-readable recording medium according to claim 1, wherein the trace data storage unit includes a trace table having a plurality of trace records relating to messages that have not yet been subjected to the linking, each trace record is associated with an unlinked message and includes pairs of a character string and value thereof, a number of notification messages related to the unlinked message and a number of processes related to the unlinked message.

8. The computer-readable recording medium according to claim 7, wherein the number of processes represents the number of receptions of trace information for a corresponding trace record, the number of notification messages represents the number of identified transfer destinations for the unlinked message, and deletion of the trace record is performed based on the number of processes being equal to the number of notification messages.

9. The computer-readable recording medium according to claim 1, wherein the transaction management table storage unit includes a transaction management table including a plurality of management records, each management record includes a pair of a key character string and value thereof, as well as an indication of linked messages that share the same pair.

10. A linking apparatus for linking related messages to one another, comprising:
    a trace data storage unit configured to store a trace record including a plurality of pairs of a key character string and value thereof included in a message;
    a trace processing unit configured to link the message with other messages;
    a transaction management table storage unit configured to store a pair of a key character string and value thereof, as well as an indication of linked messages that share the same pair; and
    a message processing unit configured to control storage and outputting of messages;
    wherein the trace processing unit selects, from a received message or trace information, a plurality of pairs of a key character string and value thereof used to link the message with other messages, registers the selected pairs in the trace data storage unit as a new trace record or updates an existing trace record that includes some of the pairs, identifies a transfer destination for the pairs included in the newly registered or updated trace record based on a first rule, and transmits, as outgoing trace information, the pairs to the identified transfer destination, and wherein, when receiving a search command including a first pair of a key character string and value thereof, the trace processing unit searches the trace data storage unit using the first pair and returns data of a found trace record to a source of the search command, and
    wherein, when receiving a message collection command including a second pair of a key character string and value thereof, the message processing unit searches the transaction management table storage unit using the second pair and transmits the message collection command including a found message to one of another linking apparatus identified using a second rule and a source of the message collection command.

11. The linking apparatus according to claim 10, wherein the first rule is a prioritization rule indicating a priority associated with each of the character strings, and the identifying identifies the transfer destination of for the pairs based on a pair having a highest priority according to the first rule.

12. The linking apparatus according to claim 10, wherein the trace data storage unit includes a trace table having a plurality of trace records relating to messages that have not yet been subjected to the linking, each trace record is associated with an unlinked message and includes pairs of a character string and value thereof, a number of notification messages related to the unlinked message and a number of processes related to the unlinked message.

13. The linking apparatus according to claim 12, wherein
the number of processes represents the number of receptions of trace information for a corresponding trace record,
the number of notification messages represents the number of identified transfer destinations for the unlinked message, and
deletion of the trace record is performed based on the number of processes being equal to the number of notification messages.

14. A parallel linking system comprising:
a plurality of linking apparatuses each linking related messages to one another and including a trace data storage unit configured to store a trace record including a plurality of pairs of a key character string and the value thereof included in the messages, a trace processing unit, a transaction management table storage unit configured to store a pair of a key character string and value thereof, as well as an indication of linked messages that share the same pair, and a message processing unit;
a trace information management apparatus; and
a linking result storage apparatus;
wherein the trace processing unit selects, from a received message or trace information, a plurality of pairs of a key character string and value thereof, the selected pairs being used to link related messages, registers the selected pairs in the trace data storage unit as a new trace record or updates an existing trace record that includes some of the pairs, identifies a transfer destination for the pairs included in newly registered or updated trace record based on a first rule, transmits, as outgoing trace information, the pairs to the identified transfer destination, and
wherein, when receiving a search command including a first pair of a key character string and value thereof, the trace processing unit searches the trace data storage unit using the first pair and returns data of a found trace record to a source of the search command, and
wherein, when receiving a message collection command including a second pair of a key character string and value thereof, the message processing unit searches the transaction management table storage unit using the second pair and transmits a message collection command including a found message to one of a linking apparatus identified using a second rule and a source of the message collection command, and
wherein each of the linking apparatuses further includes an output control unit configured to output, to a different linking apparatus, a particular group of messages stored in the transaction management table storage unit and linked using the second rule and a pair of a key character string and value thereof or store the particular message group in the linking result storage apparatus and, when the particular message group is stored in the linking result storage apparatus, send a linking completion message including a third plurality of pairs of a key character string and value thereof included in the particular message group to the trace information management apparatus,
wherein the trace record stored in the trace data storage unit further includes a number of transmissions of the trace information including the pair of a key character string and the value thereof included in the trace record and the number of processes performed when the trace information is received, and wherein, upon receiving the linking completion message from the output control unit of one of the linking apparatuses, the trace information management apparatus transmits a deletion command including the third plurality of pairs to a linking apparatus identified using the third plurality of pairs and the second rule, and
wherein, upon receiving the deletion command, the trace processing unit of the linking apparatus searches the trace data storage unit using the third plurality of pairs, identifies the trace record, deletes the identified trace record, and transmits, to the trace information management apparatus, a deletion completion message including a difference between the number of transmissions and the number of processes stored in the trace record, and
wherein, upon receiving the deletion completion messages corresponding to all of the deletion commands, the trace information management apparatus determines whether the sum of the differences included in the deletion completion messages is zero, and wherein if the sum is not zero, the trace information management apparatus transmits the deletion command again.

15. A data collection processing method implemented with a computer, the computer including a linking apparatus for linking related messages to one another, the linking apparatus including a trace data storage unit that stores a trace record including a plurality of pairs of a key character string and the value thereof included in a message and a transaction management table storage unit that stores data of a message that has not yet been subjected to linking, the method comprising:
receiving a message or trace information;
selecting, from a received message or trace information, a plurality of pairs of a key character string and value thereof, the plurality of pairs being used to link related messages;
registering the selected pairs in the trace data storage unit as a new trace record or updating an existing trace record that includes some of the selected pairs, identifying a transfer destination for the pairs included in the newly registered or updated trace record based on a first rule;
transmitting, as outgoing trace information, the pairs to the identified transfer destination;
when receiving a search command including a first pair of a key character string and value thereof, searching the trace data storage unit using the first pair and returning data of a found trace record to a source of the search command,
when receiving a message collection command including a second pair of a key character string and value thereof, searching the transaction management table storage unit using the second pair and transmitting the message collection command including a found message to one of a linking apparatus identified using a second rule and a source of the message collection command.

16. The method according to claim 15, wherein the first rule is a prioritization rule indicating a priority associated with each of the character strings, and the identifying identifies the transfer destination of for the pairs based on a pair having a highest priority according to the first rule.

17. The method according to claim 15, wherein the trace data storage unit includes a trace table having a plurality of trace records relating to messages that have not yet been subjected to the linking, each trace record is associated with an unlinked message and includes pairs of a character string and value thereof, a number of notification messages related to the unlinked message and a number of processes related to the unlinked message.

18. The method according to claim 17, wherein the number of processes represents the number of receptions of trace information for a corresponding trace record, the number of notification messages represents the number of identified transfer destinations for the unlinked message, and deletion of the trace record is performed based on the number of processes being equal to the number of notification messages.

19. The method according to claim 15, wherein the transaction management table storage unit includes a transaction management table including a plurality of management records, each management record includes a pair of a key character string and value thereof, as well as an indication of linked messages that share the same pair.

\* \* \* \* \*